US006205533B1

(12) United States Patent
Margolus

(10) Patent No.: US 6,205,533 B1
(45) Date of Patent: Mar. 20, 2001

(54) MECHANISM FOR EFFICIENT DATA ACCESS AND COMMUNICATION IN PARALLEL COMPUTATIONS ON AN EMULATED SPATIAL LATTICE

(76) Inventor: Norman H. Margolus, 4 Aldersey St., #24, Somerville, MA (US) 02143

( * ) Notice: Subject to any disclaimer, the term of this patent is extended or adjusted under 35 U.S.C. 154(b) by 0 days.

(21) Appl. No.: 09/373,394

(22) Filed: Aug. 12, 1999

(51) Int. Cl.[7] .................................................. G06F 15/00
(52) U.S. Cl. ................................ 712/13; 712/14; 712/17; 712/22
(58) Field of Search ........................................ 712/10–22

(56) References Cited

U.S. PATENT DOCUMENTS

| | | | |
|---|---|---|---|
| 5,159,690 | * 10/1992 | Margolis et al. | 703/5 |
| 5,691,885 | * 11/1997 | Ward et al. | 361/735 |
| 5,848,260 | * 12/1998 | Chen et al. | 712/17 |

OTHER PUBLICATIONS

Flynn, "Some Computer Organizations and Their Effectiveness," IEEE Transactions on Computers, vol. c–21, No. 9, pp. 948–960 (Sep. 1972).

Hord, "1. Three Dimensional Galaxy Simulations," The Illiac IV—The First Supercomputer, Computer Science Press, pp. 294–299 (1982).

Margolus, "CAM–8: A Computer Architecture Based on Cellular Automata," Fields Institute Communications, vol. 6, American Mathematical Society, pp. 167–187 (1996).

Pant, "Micro–Architectural Analysis of SPACERAM Processing Element," Submitted to Dept. of Electrical Engineering and Computer Science in partial fulfillment of the requirements for the degree of Master of Engineering and Computer Science, Massachusetts Institute of Technology (Aug. 20, 1998).

Reddaway, "Course 14: Signal Processing on a Processor Array," in the 1985 Les Houches proceedings entitled Traitement Du Signal/Signal Processing, vol. 2, Lacoume et al. (eds.), Elsevier Science (1987).

Tanimoto et al., "An Image Processor Based on an Array of Pipelines," IEEE Computer Society Workshop on Computer Architecture for Pattern Analysis and Image Database Management, pp. 201–208 (1981).

Toffoli et al., "Cellular Automata Machines," MIT Press, pp. 55–63 and 243–247 (1987).

Unger, "A Computer Oriented Toward Spatial Problems," Proc. IRE, pp. 1744–1750 (1958).

* cited by examiner

Primary Examiner—William M. Treat
(74) Attorney, Agent, or Firm—Fish & Richardson P.C.

(57) ABSTRACT

A mechanism for performing parallel computations on an emulated spatial lattice by scheduling memory and communication operations on a static mesh-connected array of synchronized processing nodes. The lattice data are divided up among the array of processing nodes, each having a memory and a plurality of processing elements within each node. The memory is assumed to have a hierarchical granular structure that distinguishes groups of bits that are most efficiently accessed together, such as words or rows. The lattice data is organized in memory so that the sets of bits that interact during processing are always accessed together. Such an organization is based on mapping the lattice data into the granular structure of the memories in a manner that has simple spatial translation properties in the emulated space. The mapping permits data movement in the emulated lattice to be achieved by a combination of scheduled memory access and scheduled communication. Moreover, the same mapping spreads interprocessor communication demands evenly over time.

69 Claims, 14 Drawing Sheets

MECHANISM FOR EFFICIENT DATA ACCESS AND COMMUNICATION IN PARALLEL COMPUTATIONS ON AN EMULATED SPATIAL LATTICE

BACKGROUND OF THE INVENTION

The present invention relates to the field of massively parallel, spatially organized computation.

The field of massively parallel, spatially organized computation encompasses computations involving large sets of data items that are naturally thought of as distributed in physical space. Such computations often exhibit some degree of spatial locality during each computational step. That is, the processing to be performed at each point in space depends upon only data residing nearby. For example, lattice simulations of physical systems using techniques such as finite-difference calculations and lattice-gas molecular dynamics have such spatial organization and locality. Other interesting examples include lattice simulations of physics-like dynamics, such as virtual-reality models and volume rendering. Many other computations can be embedded efficiently into a spatial-lattice format with local interactions, including many kinds of image-processing and logic emulation problems. A variety of spatial lattice computations are discussed in a paper by Norman Margolus, entitled "CAM-8: A Computer Architecture Based on Cellular Automata," Fields Institute Communications, Vol. 6, American Mathematical Society, 1996, p. 167.

A natural hardware organization for performing such computations arranges processors in space to mimic the array of discrete lattice sites being emulated, one processor per lattice site. Each processor communicates with neighboring processors using fixed or "static" connections. This kind of architecture can be both fast and massively parallel, since the wires between neighboring processors remain short regardless of the array size. Even if connections are provided between adjacent processors only (mesh interconnect), communication between processors that are near to each other involves few computational steps, and so remains fast.

A significant simplification can be achieved when all processors are identical and perform the same operation at the same time, as noted in an article by S. H. Unger, entitled "A Computer Oriented Toward Spatial Problems," Proc. IRE, 1958, p. 1744. In such an organization, a single copy of the control circuitry can be shared among all of the processors. Omitting the control circuitry from the individual processors reduces the size as well as simplifies the design of the processors. Shared control also allows communication between processors to be perfectly coordinated. That is, all processors transfer a bit in a given direction at the same time. Spatial non-uniformities in the computation are dealt with as differences in the data associated with each processor rather than as differences in the program that each processor follows. Such a shared-control lockstep processing style has been characterized as Single Instruction-stream Multiple Data-stream or SIMD. See an article by Michael J. Flynn, entitled "Some Computer Organizations and Their Effectiveness," IEEE Trans. on Computers, 1972, p. 948. Each processor in a SIMD machine may have several different functional units operating in a pipelined fashion.

Since computer size is normally fixed while problem size is variable, it is common for an array of SIMD processors to be used to perform a calculation that corresponds naturally to a larger spatial array of processors, perhaps with more dimensions than the actual physical array. This can be achieved by having each of the processors simulate the behavior of some portion of the space. Several physical simulations on the ILLIAC IV computer were done in this manner, as described in R. M. Hord's book, The ILLIAC IV: The First Supercomputer, Computer Science Press (1982). Typically, the emulated space is split into equal-sized chunks, one per processor. In problems with only nearby-neighbor interactions in an emulated spatial lattice, such a data organization minimizes interprocessor communication. This point was discussed by Stewart F. Reddaway (in the context of the SIMD mesh DAP computer) in his article entitled "Signal Processing on a Processor Array," in the 1985 Les Houches proceedings entitled Traitement Du Signal/Signal Processing, Vol. 2, Lacoume et al. (eds.), Elsevier Science 1987. If the chunks are large, then short range communication in the physical processor array can correspond to much longer range communication in the emulated lattice.

A simple way to perform a calculation that maps naturally onto a large array of processors is to have each physical processor simulate several virtual processors. This idea is discussed by Steven L. Tanimoto and Joseph J. Pfeiffer, Jr., in an article entitled "An Image Processor Based on an Array of Pipelines," IEEE Computer Society Workshop on Computer Architecture for Pattern Analysis and Image Database Management, 1981, p. 201. In the virtual processor approach, the physical hardware emulates a virtual machine of the size and type needed to directly perform the calculation. Since virtual processors are simulated both sequentially by each physical processor and in parallel by all of them, hardware designed explicitly for virtual processing can take advantage of both multiple processors and multiple pipelined functional units within each processor. In such hardware, memory and communication latency (i.e., time delay) can be absorbed into the processing pipeline. This approach was used, for example, by Tommaso Toffoli and Norman Margolus in the design of their CAM-6 virtual processor cellular automata hardware, as is discussed in their book, Cellular Automata Machines, MIT Press (1987), p. 243.

In these early cellular automata machines, programmers could choose from among a restricted set of communication patterns within a fixed-size emulated lattice (see Toffoli and Margolus, p. 55). The more recent CAM-8 machine, described in U.S. Pat. No. 5,159,690, in the name of Norman H. Margolus, uses a simpler communication scheme, in which sheets of bits move a given amount in a given direction in the emulated lattice (which has a programmable size and shape). This shifting bit-sheet scheme is implemented as a pipelined version of traditional SIMD mesh data movement. Because of the specialization to shifting entire sheets of bits, however, only a few parameters controlling a restricted set of repeated communication patterns (as opposed to detailed clock-by-clock SIMD control information) are broadcast to the processors.

In a virtual processor architecture such as CAM-8, in which the state of the emulated spatial lattice is held in memory devices, the speed of processing is limited primarily by the memory bandwidth. Recent developments in semiconductor technology allow processing logic and DRAM memory to be placed together on a single semiconductor chip, thus making enormous memory bandwidth potentially available to virtual processor lattice computations. In this context, performance and flexibility of a mesh array of chip-scale processors may become limited by communications bandwidth between chips, and by the bandwidth of the control stream coming into the chips. A uniform SIMD communication architecture (like that of CAM-8) is not appropriate in this context, since a uniform array of SIMD processing nodes on each chip would make very uneven and inefficient use of inter-chip communication resources: nodes along an edge of the array on one chip would either all need to communicate off-chip simultaneously, or all need no communication simultaneously. Furthermore, a fixed virtual machine model architecture (like that of CAM-8) gives up much of the flexibility of a more general SIMD architecture. For flexible fine-grained control, a high control bandwidth is needed.

To achieve maximum memory bandwidth, on-chip DRAM must be used in a constrained fashion. For example, in a given block of DRAM, once any bit in a given DRAM row is accessed, bandwidth may be wasted if all of the bits of that row are not used before moving on to another row. Similarly, if memory rows are accessed as a sequence of memory words, then all of the bits in entire words may also need to be used together. These kinds of memory granularity constraints must be efficiently dealt with. Temporarily storing data that are read before they are needed, or that can't be written back to the right block of memory yet, wastes the bandwidth of the temporary storage memories, and wastes the space taken up by these extra memories. Not having data available at the moment they are needed wastes processing and communications resources.

SUMMARY OF THE INVENTION

The present invention features a mechanism for optimizing the use of both memory bandwidth and inter-chip communications bandwidth in a simple and flexible lattice-emulation architecture. Provided are a processor and corresponding method for performing operations associated with a process occurring in at least one emulated lattice having at least one sector having lattice sites therein. The operations are performed by at least one processing node associated with the at least one sector. The processing node includes a memory for storing lattice site data associated with the lattice sites and the lattice sites each are associated with data in a data structure. Sets of homologous bits, one from each associated data structure at each lattice site, form bit-fields.

According to one aspect of the invention, a shift-invariant partition of the at least one sector into pluralities of lattice sites forms pluralities of site-aggregates, each site-aggregate being unsymmetric about every parallel to at least one edge of the at least one sector. A portion of each bit-field associated with each site-aggregate forms a bit-aggregate, which is stored in the memory as an addressable unit. The processing node shifts data for at least one of the bit-fields within the at least one sector of the emulated lattice by addressing each bit-aggregate in which each portion of the at least one of the bit-fields is stored.

According to another aspect of the invention, the at least one sector is partitioned in a shift-invariant manner into pluralities of lattice sites forming first site-aggregates, which are grouped to partition the lattice sites of the at least one sector in a shift-invariant manner to form a plurality of second site-aggregates, whereby a portion of each bit-field associated with each first site-aggregate forms a first bit-aggregate. Pluralities of the first bit-aggregates are grouped together to form second bit-aggregates of data associated with corresponding second site-aggregates, each of which is stored in the memory as an addressable unit composed of separately addressable first bit-aggregates. The processing node shifts data for at least one of the bit-fields within the at least one sector by addressing each second bit-aggregate in which each portion of the at least one of the bit-fields is stored, and addressing each of the constituent first bit-aggregates in the addressed second bit-aggregate.

Embodiments of the invention may include one or more of the following features.

The bit-field data for each of the lattice sites to be updated may be processed to transform the value of the associated data structure. The processing can comprise performing a symbolic operation. Alternatively, the processing can comprise performing a numerical operation.

The processing may include reading from the memory the bit-field data for each lattice site to be updated, updating the read bit-field data and writing the updated bit-field data to the memory. The updating can occur after the shifting and the bit-field data read from the memory are shifted bit-field data. The updating can occur before the shifting and the bit-field data written to the memory are shifted bit-field data.

The at least one sector may comprise a plurality of sectors and the operations may be performed by an array of processing nodes, each associated with a different one of the sectors in the plurality of sectors and communicating with others of the processing nodes associated with neighboring ones of the sectors in the plurality of sectors.

The bit-field data may be shifted periodically within each sector of each associated processing node, such that the data that shifts past an edge of the sector wraps to the beginning of an opposite edge of the sector. The periodic shifting may be performed by memory addressing and by re-ordering bits within addressed ones of the bit-aggregates.

The periodically shifted bit-field data can be read by the processing nodes. Each of the processing nodes can access data for one of the site-aggregates to be processed and communicate the wrapped data to a nearby one of the processing nodes, the communicated wrapped data being substituted for the wrapped data within the nearby one of the processing nodes to which it is communicated.

The processing can include using a table lookup. Each of the processing nodes can include a plurality of processing elements for processing a parallel stream of the bit-field data and the table lookup can be shared by all of the processing elements in each processing node.

The bit-field data can be loaded into the shared lookup table so that data from all of the lattice sites in a given one of the sectors can be used to randomly access data belonging to a fixed set of the lattice sites.

The plurality of lattice sites aggregated within each of the site-aggregates may have a uniform spacing relative to each edge of the at least one sector, the difference for any two of the site-aggregates in the respective numbers of lattice sites lying within a give distance of an edge being at most one.

The second bit-aggregate may aggregate first bit-aggregates which are all associated with a single sector, and which in their pattern of grouping of data associated with lattice sites, are all periodic translations of each other along a single line in a single sector. The aggregated first bit-aggregates can then be ordered along this line, with this ordering reflected in the memory addresses where they are stored. Shifting of the at least one bit-field then involves only a cyclic permutation in the order of each set of constituent first bit-aggregates within the corresponding second bit-aggregate.

The at least one emulated lattice can include at least two emulated lattices having unequal numbers of the bit-fields. The shifted bit-field data from the at least two emulated lattices may be processed together.

The memory can include at least two memory blocks, and more than one of the at least two memory blocks can be coupled to each processing element.

The plurality of processing elements can share a lookup table.

Each processing element can include bit-serial arithmetic hardware.

The memory can include at least one memory block and portions of the at least one memory block can be selected to store control information used during a period in which a row of memory words is processed.

Each of the processing nodes can be connected by mesh I/O links to neighboring processing nodes to form a mesh array, each of the processing nodes being associated with an equal-sized sector of the emulated lattice and the performance of the operations can be divided among the processing nodes.

The operations can be performed under the control of a host to which the processor is connected.

The processing node can be coupled to a nonvolatile memory device for storing a program. A copy of the program is loaded into the processing node at boot time.

The processing node can include reprogrammable logic blocks of the sort used in FPGA devices, along with reprogrammable I/O pins, for interfacing with other electronic devices.

The processing node can control an external memory device used for storing bit-field data and for storing control information.

The mechanism for efficient data access and communication in spatial lattice computations of the present invention offers several advantages, particularly for large 2D and 3D spatial lattice computations. The data access and communication mechanism relies on an arrangement of data in memory and a scheduling of memory accesses and communication events to optimize the use of both memory bandwidth and communications bandwidth. For computations (including symbolic and arithmetic) on emulated spatial lattices, all bits that are read from memory are exactly those needed next by the processing and communication hardware. Thus, the mechanism deals with a hierarchy of memory granularity constraints by matching data organization in memory to the most efficient memory access patterns, without having to buffer data. Moreover, the mechanism takes advantage of memory layout and access order to produce an even demand on communication resources. A direct virtual processor emulation of a SIMD array on each processing node would not have this property. Additionally, slow external memory can also be dealt with efficiently by simply treating internal memory as an additional level in the granularity hierarchy. The method for dealing with memory granularity and for allowing spatial shifting of lattice data by addressing is also directly applicable to lattice calculations on conventional computers.

The mechanism further supports a virtual machine model for performing SIMD operations on selected subsets of virtual processors. For example, sublattices of the emulated space can be identified and processed in turn. Virtual processors that are not active in a given computational step are not emulated during that step. Both the spatial structure of the emulated lattice and the structure of the data associated with the lattice sites can change with time. The mechanism efficiently supports a variety of simple high-level spatial machine models, including a simple mesh machine, a reconfiguring crystal lattice machine and a pyramid machine.

Each processing node can have its own copy of various programs. A host computer may be used to initialize and modify this program information, and to initiate synchronized execution of programs. In a system that includes a host computer, the node-resident programs can be viewed as a kind of micro-code. If all nodes are programmed identically, then the hardware acts as a SIMD machine. Providing micro-coded control programs resident within each node takes advantage of high on-chip memory bandwidth to allow full generality of operations. There is no need to embed a restricted virtual machine model into each node as was done, for example, in CAM-8. Such freedom also resolves conflicts between virtualization and the use of fast hardware registers. Lattice sites may be updated in a "depth first" manner, with a sequence of operations applied to each row-sized site-aggregate before moving on to the next, and with each of the sequence of row-operations bringing together a different combination of bit-fields. Registers and temporary memory storage may be used to hold intermediate results during each such sequence, and then freed and reused for processing the next site-aggregate.

DETAILED DESCRIPTION

Figure 1:
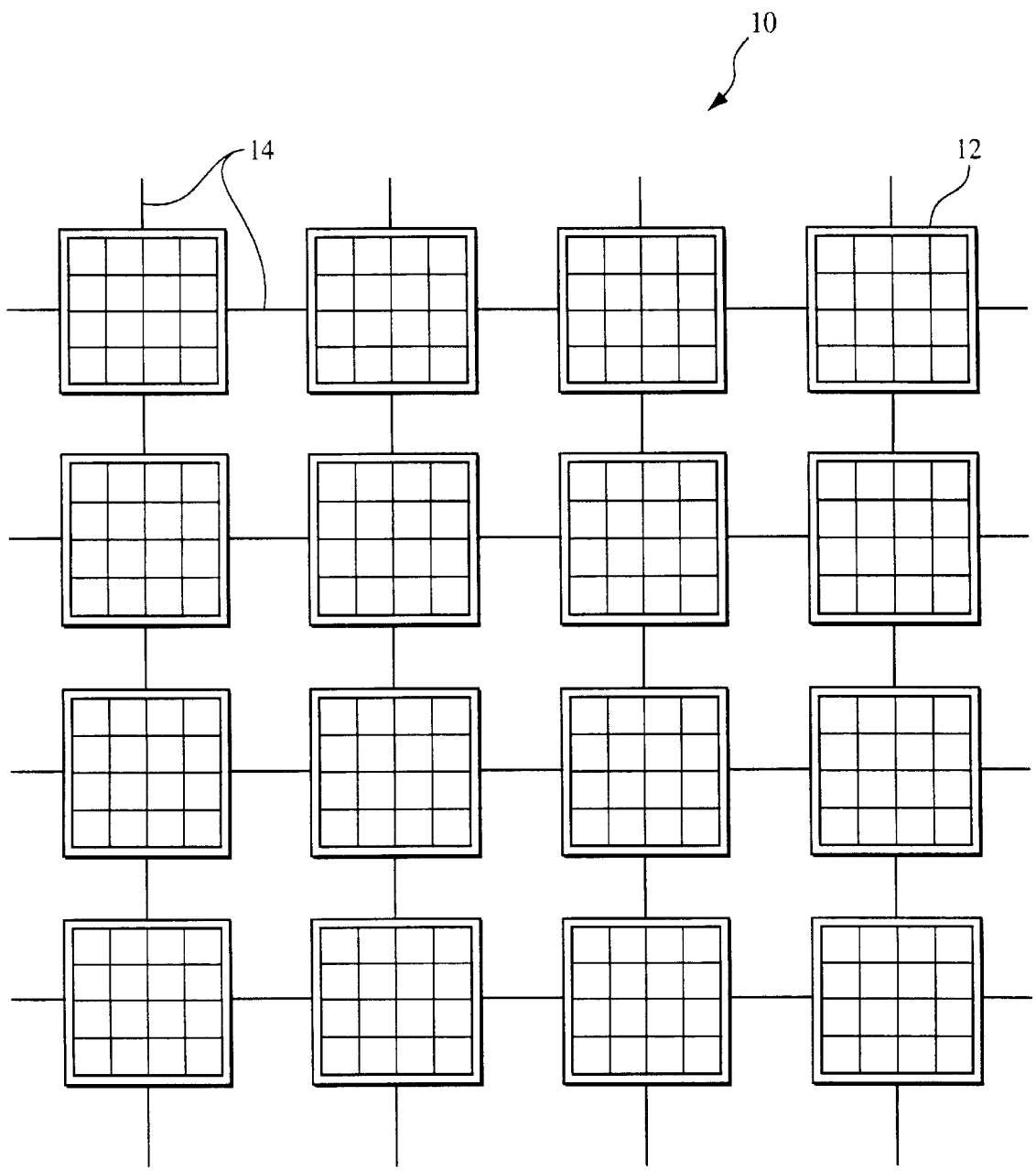
FIG. 1 is a representation of a spatial lattice computer as a mesh array of processing nodes, each processing node corresponding to an equal-sized sector of the spatial lattice.

Referring to FIG. 1, a parallel computation occurring in a physical space 10 is emulated by a mesh array of processing nodes 12. The emulated space 10 includes an n-dimensional spatial arrangement of lattice sites each associated with a data element (or structure), which may vary from site to site. Both the structure of the lattice and the structure of the data may change with time. Each processing node 12 in the mesh array corresponds to an equal-sized sector of the emulated space (or spatial lattice) 10. Together, the processing nodes 12 perform parallel computations, each acting on the lattice data associated with its own sector of the emulated space 10.

As shown in FIG. 1, each processing node 12 is connected to and communicates with its neighboring processing nodes in the mesh array by a mesh I/O interface 14. The mesh I/O interface 14 provides forty-eight single-bit differential-signal links that can be apportioned among up to six directions.

Figure 2:
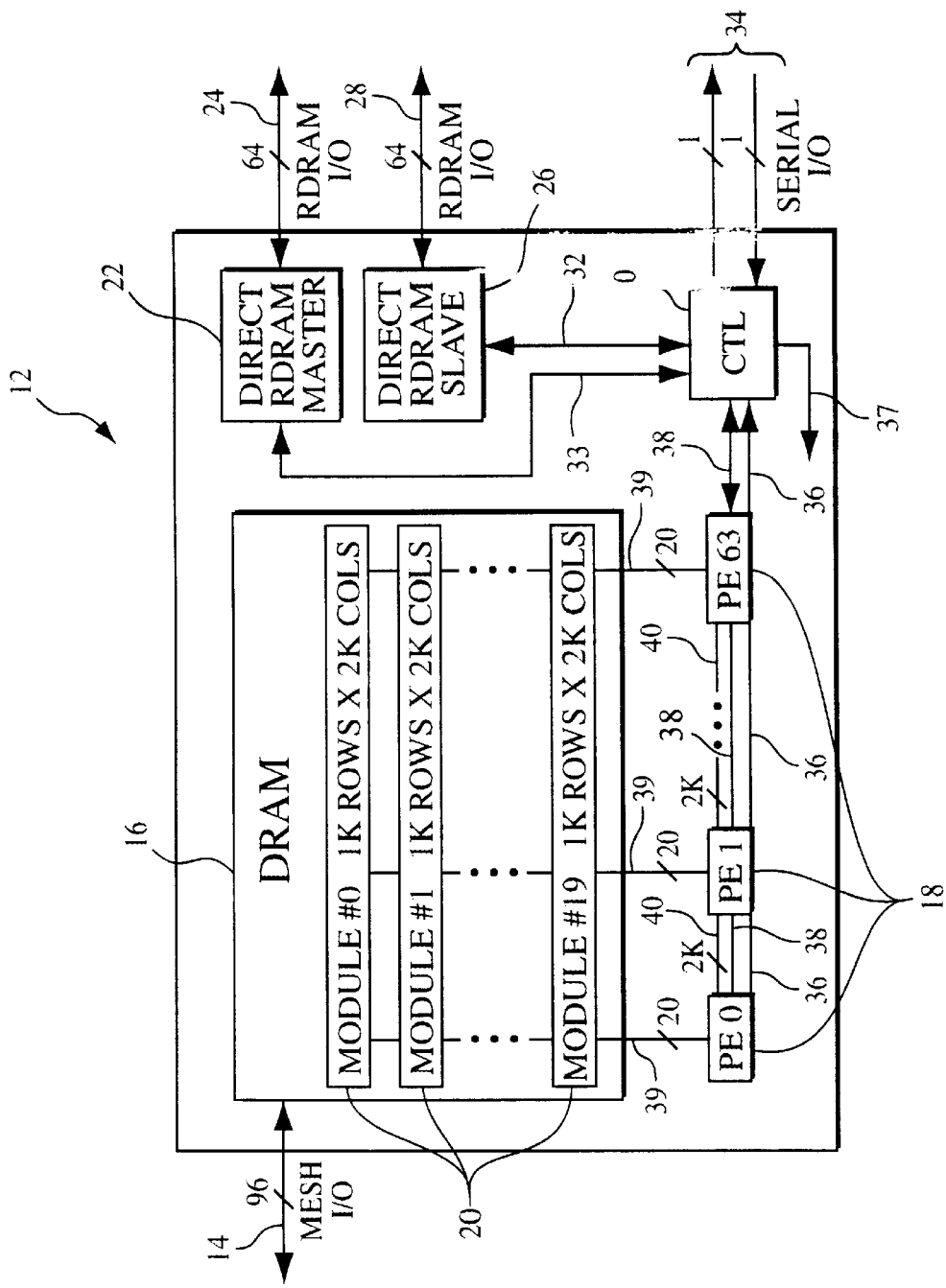
FIG. 2 is a block diagram of the processing node shown in FIG. 1.

Referring to FIG. 2, each processing node 12 includes a memory 16 connected to a plurality of processing elements (PEs) 18. The memory 16 includes a plurality of DRAM modules 20. Data belonging to a given sector may be stored in the memory 16 of the corresponding processing node 12 or in an external memory associated with that processing node, as will be described. Each processing node 12 simultaneously processes data associated with a plurality of lattice sites using the processing elements 18. All of the processing nodes operate and communicate in a synchronized and predetermined fashion in order to implement a spatially-regular lattice computation. Preferably, for performance reasons, the processing node 12 is implemented as a semiconductor chip. However, it could be implemented as a discrete design as well.

Also included in the processing node 12 are the following: a master memory interface 22 allowing the chip to access an external slave memory via a first memory I/O bus 24; a slave memory interface 26 allowing the processing node or chip 12 to be accessed as a memory by an external device via a second memory I/O bus 28; and a controller 30. The controller 30 receives control information and data from external devices via memory interfaces 26 and 22 on memory interface I/O lines 32 and 33, respectively, and over a serial I/O bus 34. During processing, the controller 30 also receives control information at high bandwidth from the memory 16 through the PEs 18 over input control lines 36 and distributes control information to the memory 16 and PEs 18 over a control bus 37. Memory 16 is also read and written through the PEs 18 over bidirectional data lines 38 and memory bus lines 39. The PEs 18 communicate with each other over a shared LUT bus 40, as will be described. Details of the control bus signal interconnections, as well as other control and clocking signals, have been omitted for simplification.

Memory Granularity

The structure of the memory 16 imposes certain constraints on efficient computation. Perhaps the most prominent are certain granularity constraints that determine which groups of memory bits should be used together. In the illustrated embodiment, the memory (DRAM) bits on each processing node 12 are logically organized as 2D arrays of storage elements which are read or written on a row-at-a-time basis. For each block of DRAM, it takes about the same amount of time to read or write all of the bits from a sequence of rows as it does to access just a few bits from each row. For this reason, computations performed by the processing node 12 are organized in such a way as to use all of the data from each row as that row is accessed. Similarly, rows are divided up into smaller words, which correspond to data units that are communicated to and from the memory modules 20. Computations are organized to also use all of the bits of each word as that word is read. Thus, the processing nodes 12 handle memory granularity constraints by organizing the memory and processing hardware so that lattice data that are needed at the same time can always be stored together as a bit-aggregate in the memory (i.e., a word, a row, etc.) that is efficiently accessed as a unit. It will be appreciated that the techniques described herein are quite general and apply to other types of lattice computation architectures having a hierarchy of memory granularity constraints.

Data Movement

Points in the emulated space that have data associated with them are called lattice sites. The structure of the data item associated with each lattice site may vary from site to site and may change with time. The structure of the lattice itself may also change with time. The processing nodes 12 of the lattice processor array 10 use a spatial communication scheme to move data within the emulated space. The spatial communication scheme involves a uniform shifting of subsets of lattice data. A set of homologous bits, one from each of a regularly spaced subset of lattice sites, forms a bit-field. Each processing node 12 performs a data movement operation separately on each bit-field to shift the bit-field uniformly in space. Every bit in each bit-field that is operated upon is shifted to a new position. Each shifted bit is displaced by the same distance in the same direction.

Figure 3A:
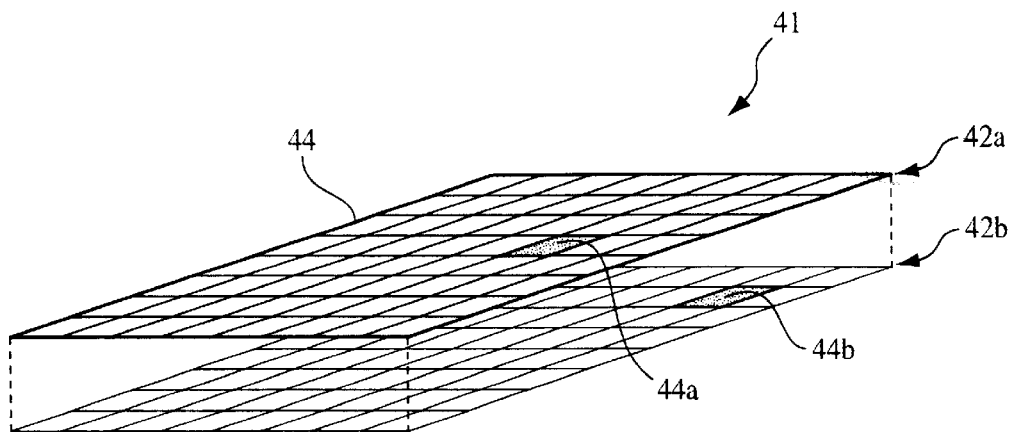
FIGS. 3A and 3B are depictions of a two-dimensional (2D) example of a uniform lattice data movement (bit-plane shifting).
Figure 3B:
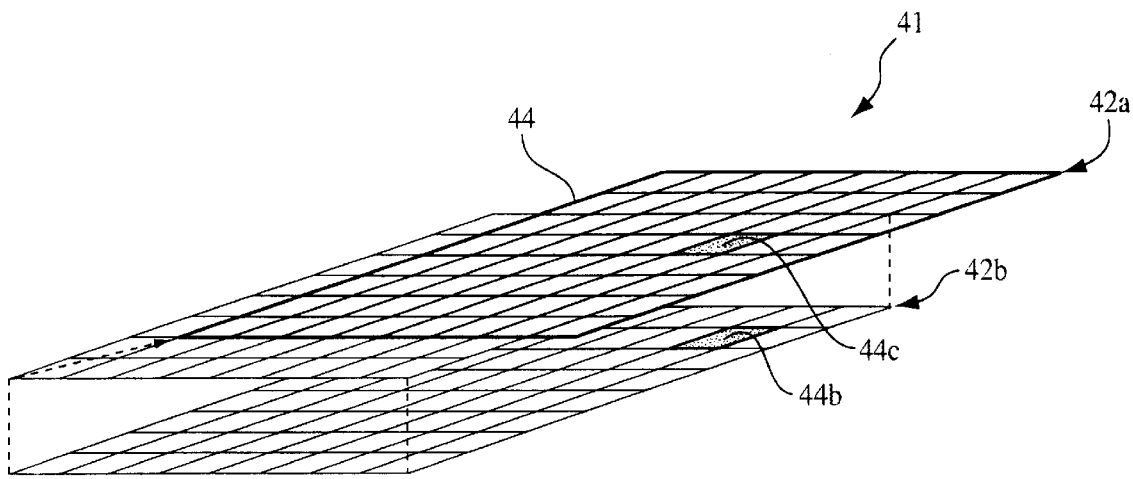

The above-described bit-field shifting concept may be more clearly understood with reference to FIGS. 3A–B. Referring to FIGS. 3A–B, an exemplary 2-D square lattice 41 having two bit-fields 42a, 42b of bits 44 is depicted. FIG. 3A shows the bits before a shift is performed and FIG. 3B illustrates the same bits after a shift has been performed. One top bit-field bit 44a and a bottom bit-field bit 44b are shaded to highlight the effect of the shifting operation on bits in the bit-fields 42a, 42b. As can be seen in FIG. 3B, only the top bit-field 42a shifts in this example. The shift of the top bit-field 42a brings together the two shaded bits 44a and 44b, both of which belonged to different lattice sites before the shift. It will be noted that every similar pair of bits that were initially separated by the same displacement as the two marked bits are also brought together by this shift.

If the square lattice 41 in FIGS. 3A–B represents an entire lattice, then the shifted data that moves beyond the edge or boundary of the lattice space wraps around to the opposite side of the space. If, instead, the square lattice 41 represents only the sector of space associated with a single processing node 12, then the shifted data that crosses the edge of that sector is communicated to adjacent processing nodes (i.e., processing nodes associated with adjacent sectors), each of which is performing an identical shift. In this manner, a seamless uniform shift across the entire lattice can be achieved.

Lattice Partitioning

After each movement of data, the processing nodes 12 separately process the data that land at each lattice site. Since each site is processed independently of every other site, processing of lattice sites can potentially be done in any order and be divided up among many or few processors. In the embodiment described herein, each processing node 12 has sixty-four (64) processing elements 18, and so updates 64 lattice sites at a time. A set of lattice sites that are updated simultaneously within a node is referred to as a site-group. All lattice sites in a site-group are processed identically.

Figure 4:
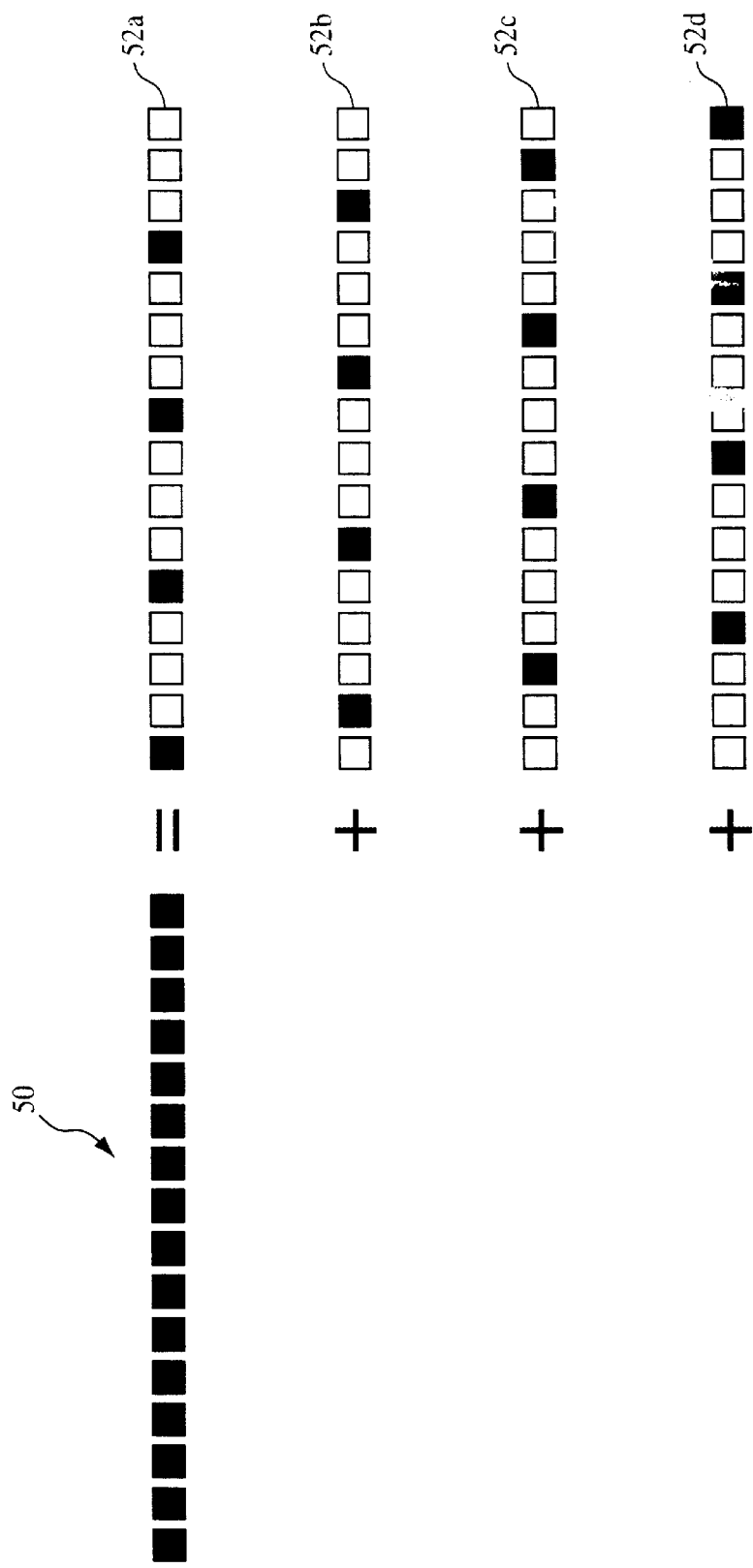
FIG. 4 is a depiction of a partition of a one dimensional (1D) sector into groups of sites that are updated simultaneously.
Figure 5:
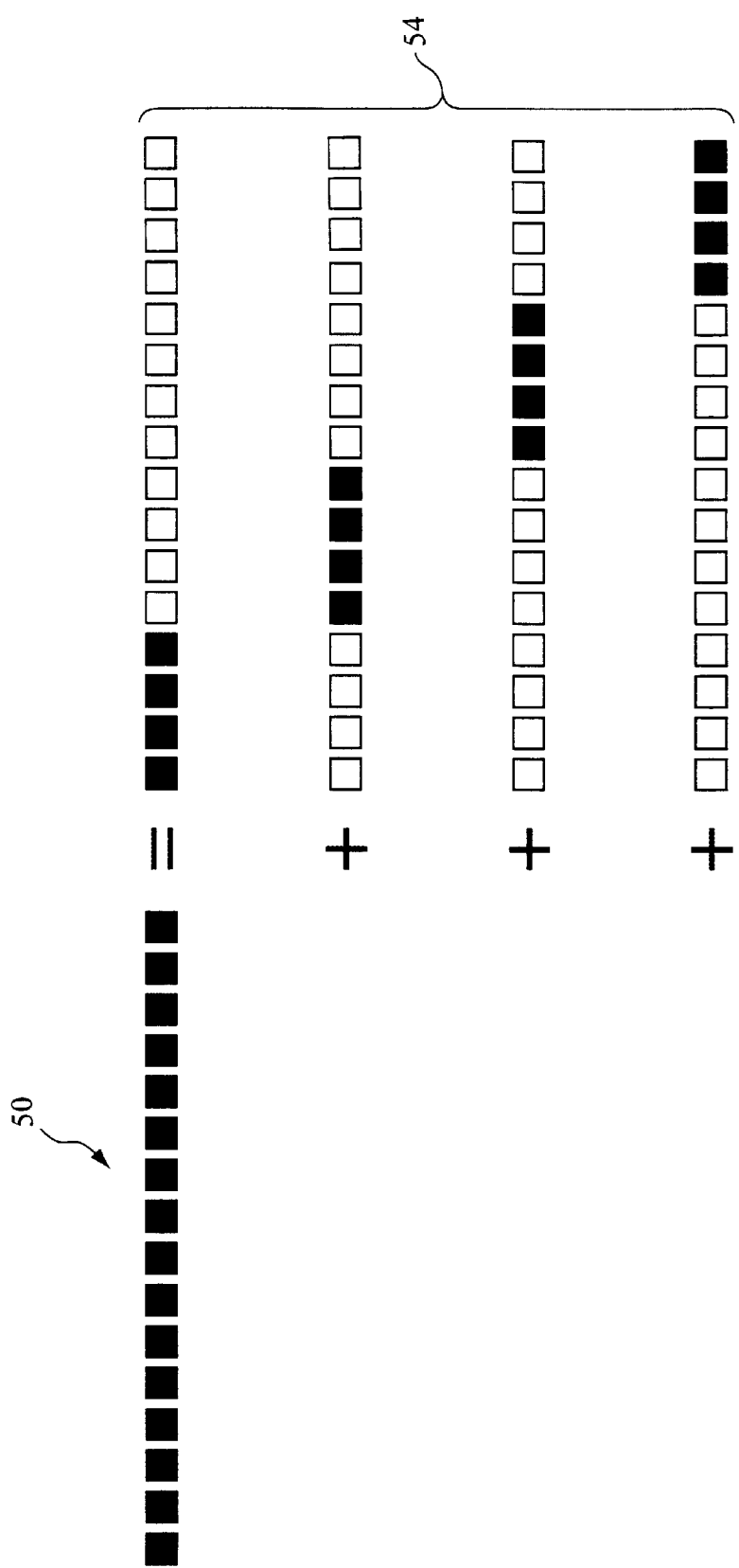
FIG. 5 is a depiction of a 1D partition that is not shift invariant.

Referring to FIG. 4, a one-dimensional (1D) sector 50 is partitioned into a plurality of site-groups 52a–52d as shown. For clarity, the figure depicts only 4 lattice sites to be updated at a time. FIG. 5 illustrates an alternative site-group partitioning 54 of the same 1-D sector 50 (FIG. 4).

In the preferred embodiment, a site-group has the same number of elements as a memory word. Therefore, the partition of a lattice into site-groups induces a corresponding partition of bit-fields into memory words: all of the bits of a bit-field that belong to the same site-group are stored together in the same memory word. It can be appreciated that, to process a site-group during an operation without data bit-shifting, a desired set of bit-fields may be brought together for processing by simply addressing the appropriate set of memory words.

Periodic Shifts

For an entire space emulated by a single processing node only, bit field shifts are periodic within a single sector. That is, shifted data wraps around within the bit-field sector. The partition of the lattice into site-groups remains fixed as the bit-fields are shifted. If the partition of FIG. 4 is used to divide the lattice up into site-groups, and a bit field is shifted by some amount, one observes a very useful property: each set of bit-field bits grouped together into a single site-group before the shift are still grouped into a single site-group after the shift. Since these groups of bit-field bits are stored together in memory words associated with site-groups, shifts of data simply move the contents of one memory word into another. A partition of lattice sites such as that of FIG. 4 that is invariant in its grouping of bits under all periodic bit-field shifts within a sector may be described as a "shift invariant" lattice partition. Equivalently, a shift-invariant partition can be characterized as a pattern of grouping of lattice sites which isn't changed if the pattern is shifted periodically. The partition of FIG. 5 is an example of a lattice partition that is not shift invariant.

For a shift invariant partition, spatial shifting of bit-field data can be accomplished by memory addressing. To process a site-group, the processing node brings together associated portions of a designated set of shifted bit-fields by simply addressing the corresponding set of memory words. For each bit-field, and for any shift, all of the shifted data needed for the site-group are accessed together in a single memory word, and all of the data in that memory word belong to the same site-group.

Although the grouping of bits into memory words is invariant under bit-field shifts, the order of bits within words is not. Bits that shift past one edge of the sector wrap around to the opposite edge. Assuming that bits within words follow the order of lattice sites in corresponding site-groups in FIG. 4, wraparound only results in a rotation of the bit-order within each memory word as it is accessed.

This bit-field shifting technique can be extended to additional levels of memory granularity. For example, in this embodiment memory words are grouped into memory rows, and entire rows must be processed together for the sake of efficiency. Preferably, therefore, site-groups of lattice sites are further grouped together or aggregated into a set of larger site-aggregates that also form a shift-invariant partition of the lattice. As an example of site-group aggregation, and referring once again to FIG. 4, if the first and third site-groups (52a and 52c, respectively) are combined to form a larger site-aggregate, and the second and fourth site-groups (52b and 52d, respectively) combined to form another larger site-aggregate, then the resulting set of larger site-aggregates also forms a shift-invariant partition of the lattice. Consequently, the same sets of bits from each bit-field are grouped together by the larger site-aggregates both before and after any bit-field shifts. If the larger site-aggregate is the size of a DRAM row, then all of the words of a bit-field that belong to the constituent site-groups can be stored together in the same DRAM row. With this data organization, to bring together shifted data from some set of bit-fields for a row-sized site-aggregate, the processing node 12 simply addresses the set of rows that contain the shifted data. As it processes each constituent site-group in turn, the processing node addresses only words within this set of rows. This technique can be applied to further levels of memory granularity.

Note that above, in defining a shift-invariant partition of the lattice, it has been assumed that the spatial structure of the lattice is uniform and unchanging. A spatial translation of a bit-field that moves one of the bit-field bits from one lattice site to another is assumed to move all of the bit-field bits to new lattice sites. More general schemes can be constructed by superimposing and coupling several spatially-uniform emulated lattices, as is discussed in the section, "Virtual Machine Models". Here, it will be assumed that the lattice is uniform and unchanging.

Composite Shifts

Consider now a 1D lattice divided amongst a 1D array of processing nodes. The shifting of bit-fields uniformly along the lattice is accomplished by a combination of periodic shifts within each lattice sector and communication between processing nodes.

Figure 6:
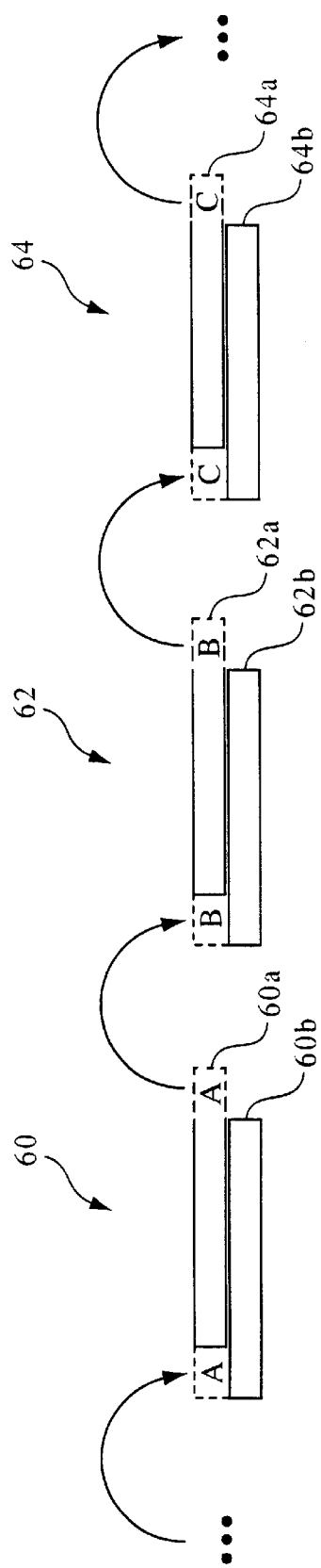
FIG. 6 is a depiction of a data movement process in which periodic shifts within sectors are composed into a uniform shift along a lattice.

Referring to FIG. 6, three adjacent lattice sectors 60, 62, and 64, each having two bit-fields 60a–60b, 62a–b and 64a–b, respectively, are shown. The sectors 60, 62, 64 are illustrated as having the top bit-field 60a, 62a, 64a, respectively, shifted to the right. The portion of the top bit field that spills past the edge of each sector is labeled A, B and C, for the top bit-fields 60a, 62a and 64a, respectively. Where this data is placed by a periodic shift within the sector is indicated with a matching label. The location in which the protruding data belongs as a result of a uniform shift is indicated with an arrow. It will be recognized that the uniform shift is accomplished by simply substituting the bits of periodically shifted data that wrap around past the edge of one sector (the wrapped bits) for the wrapped bits within the next adjacent sector. Therefore, bits replace corresponding bits. In other words, a uniform shift transfers bits to the same relative positions within a sector as a same-sized periodic shift. A uniform shift merely places the wrapped bits in the appropriate sector.

In the described embodiment, all processing nodes 12 operate synchronously, each acting on an identically structured sector of lattice data, with each processing the same site-group at the same time. Periodically shifted site data for a designated set of bit-fields and for a designated site-group are assembled by addressing the appropriate DRAM words and rotating each word (as needed), in the manner described above. Bits of data that wrap around the edge of a sector are communicated to an adjacent sector, where they replace the corresponding (wrapped) bits in the site-group being processed in that adjacent sector. In this manner, exactly the data that are needed for the set of corresponding site-groups being processed by the various nodes are read from DRAM.

After the data movement is completed, each lattice site is updated independently and the bit-fields that constitute each updated site-group are written to DRAM. Thus, all bits that are read from memory are used immediately and returned to memory. Similarly, the processing node 12 can alternatively (or also) perform shifts of the bit-fields after the updating (processing) operation, using the addressing of where data is written to perform the periodic portion of the shifts.

Shifting in 2D and 3D

Figure 7:
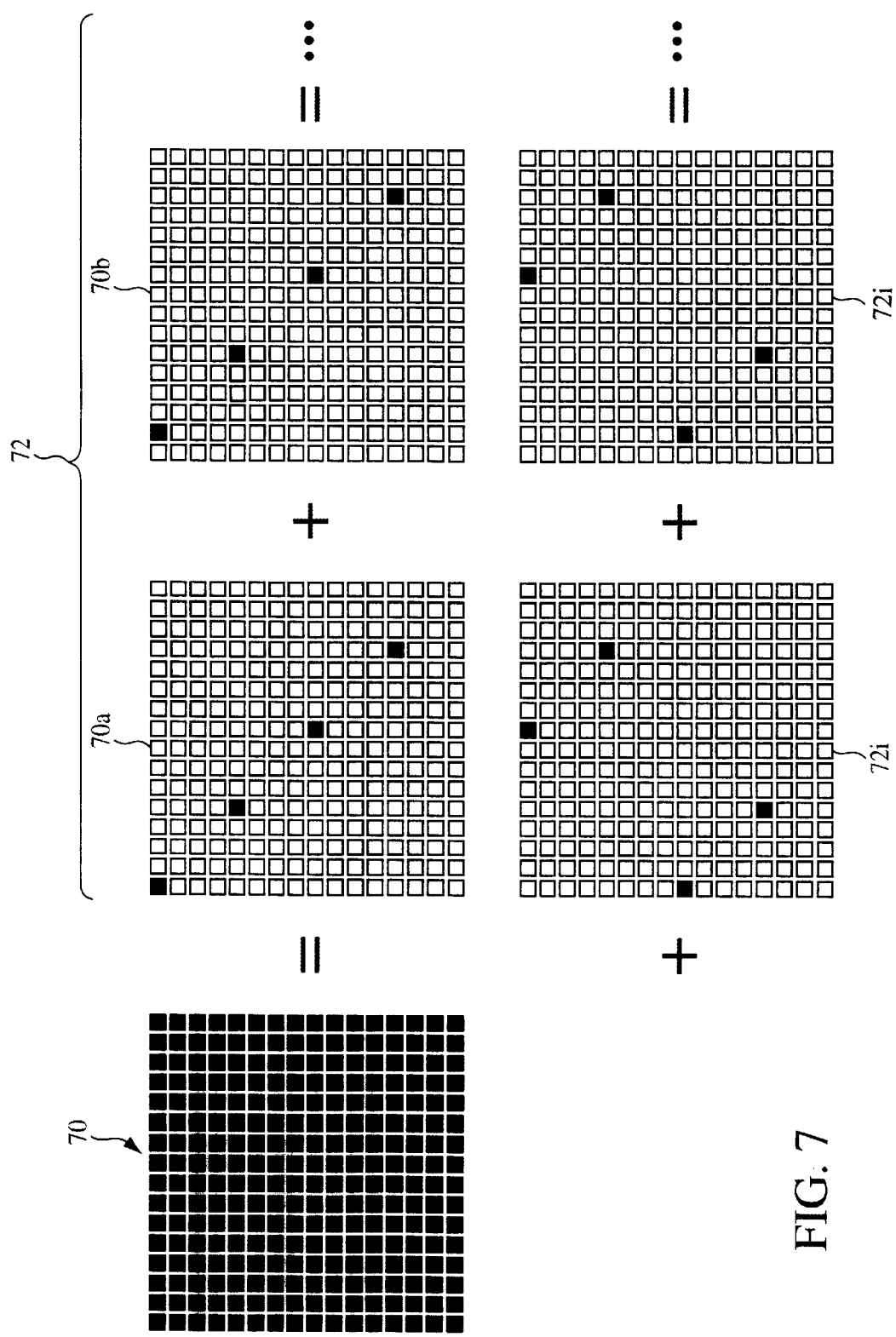
FIG. 7 is a depiction of a balanced partition of a 2D sector.

A memory organization based on shift-invariant partitioning of lattice sectors is also effective in multi-dimensional applications. Referring to FIG. 7, an exemplary square 2D sector 70 (shown as a 16×16 lattice) is partitioned into sixty-four four-element site-groups 72, of which four—a first site-group 72a, a second site-group 72b, a ninth site-group 72i and a tenth site-group 72j—are shown. The first site-group 72a is spread evenly along a diagonal. The other 63 site-groups, including the site-groups 72b, 72i and 72j are periodic translations of the diagonal pattern. Thus, these site-groups demonstrate the property of a shift-invariant partition. That is, all sets of bit-field bits that are grouped together before a shift are also grouped together after the shift. Assuming that bits are ordered vertically within words, that is, the first bit belongs to the uppermost lattice site in a site group, and so on from top to bottom, it can be seen that purely horizontal periodic shifts of bit-fields do not change which bits are grouped together into words or the bit order (within words). Purely vertical periodic shifts may rotate the bits within a word. Thus, once again, any periodically shifted data for a designated set of bit-fields and for a designated site-group can be assembled by reading the appropriate shifted data, and rotating the bits within the words which require bit re-ordering. By constructing a set of larger site-aggregates out of the site-groups in a shift-invariant fashion (as described above), a processing node can process entire rows at a time, processing each constituent site-group in turn.

Periodically shifted bit-fields within each 2D sector can be glued together into uniformly shifted bit-fields that slide seamlessly along the composite space. As was described above with reference to 1D sectors, wrapped data from one sector replaces corresponding bits in an adjacent sector. This substitution is performed one dimension at a time. The processing node takes data that has wrapped around horizontally and moves it to the adjacent sector where it belongs. The now horizontally-correct data is then shifted vertically by moving data that has wrapped around vertically into the adjacent sector where it belongs. The net effect of this two-hop process may be to communicate data to a diagonally adjacent sector, even though the processing nodes only communicate directly with their nearest neighbors.

The above-described technique applies equally well to 3D. Consider, for example, a bit-field sector in which one site-group is evenly spaced along the diagonal of a cube and the other site-groups are periodic shifts of the diagonal pattern. Assuming that the bits within the words are numbered from top (of the cube) to bottom, the side-to-side and front-to-back periodic shifts of bit-fields do not change the order of bits within a word. Once again, vertical periodic shifts merely rotate the bit order within a word. Thus, a periodic bit-field shift can always be accomplished by addressing plus a rotation of bits within a word. A uniform shift can be achieved through periodic shifts and inter-node communications.

Balancing Communication Demands

Returning to FIG. 4, it can be seen that each site-group has exactly one lattice site within four positions of the edge of the sector, two within eight positions, and so forth. Consequently, a bit-field can be shifted by four positions by communicating exactly one bit to an adjacent sector for each DRAM word. To shift by eight-positions requires a communication of two bits. In 1D, this even spacing of site-groups is an automatic by-product of shift invariance and guarantees that, for a given shift amount, the demand for inter-node communication resources is divided as evenly as possible between the various words of a bit-field.

Again referring to the 2D example of FIG. 7, it is likewise noted that each site-group has exactly one lattice site within four positions from each edge of the sector, two within eight, and so on. Consequently, the communication resources needed to implement a shift of a bit-field are as balanced as possible between the various words of the bit-field. Because not all shift-invariant partitions in 2-D have this additional balanced property, it is desirable to choose partitions which do so that communication resources are used as efficiently as possible. In 3D, the periodically shifted diagonal site-groups discussed above also have this balanced property.

Figure 8:
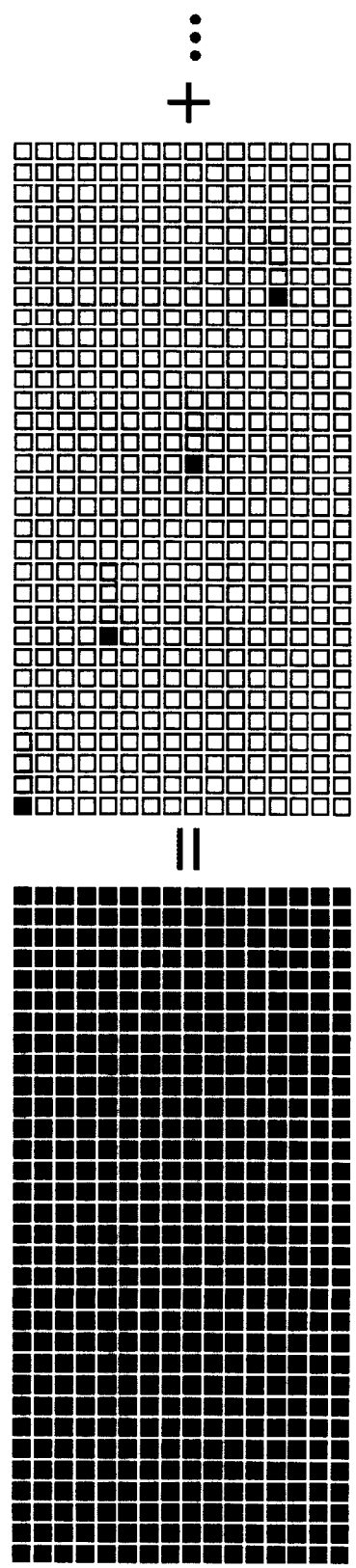
FIG. 8 is a depiction of a partition of a 2D sector of unequal dimensions.

Consider now a bit-field sector having edges of unequal lengths. Sector size is selected to be a power of two along each dimension. In the 2D example shown in FIG. 8, the horizontal dimension is twice as long as the vertical dimension. In the example, the elements of each site group are spread out twice as much horizontally as vertically. One site-group still runs "diagonally" from corner to corner, and the rest are still periodic shifts of this diagonal pattern. With this partition, communication demands for each dimension will be as balanced as is possible. In the illustrated example, a given shift amount would require about twice the communication resources per word for a given vertical shift along the lattice as for the same horizontal shift, since sites in each site-group are twice as close together vertically. This disparity in communications is, however, unavoidable in this case. The sector of the bit-field has a horizontal edge that is twice as long as the vertical edge, and so overall twice as many bits "spill over the edge" for a given vertical shift as for the same horizontal shift.

DRAM Module

Figure 9:
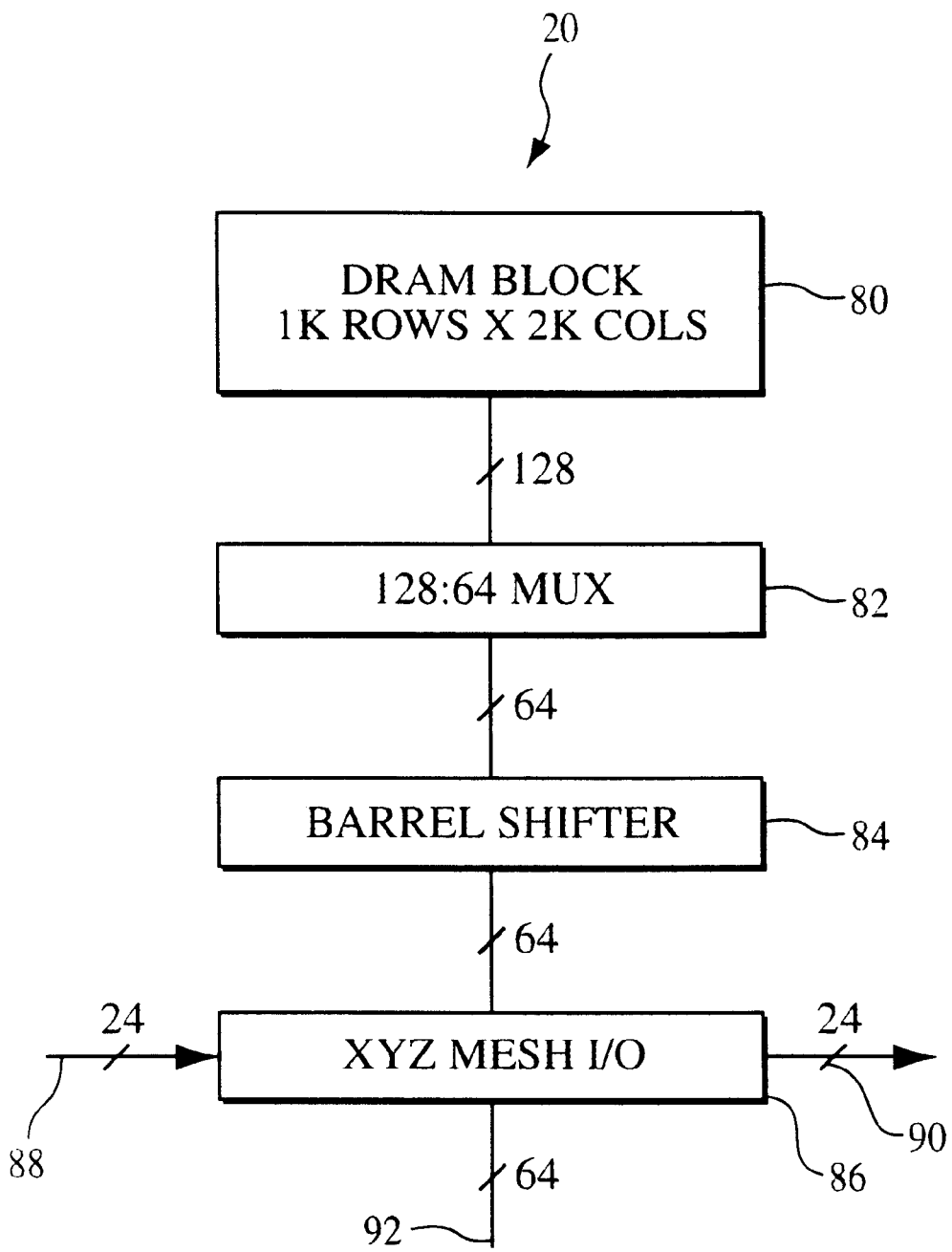
FIG. 9 is a block diagram of the functional units that make up the DRAM module shown in FIG. 2.

In the described embodiment, each DRAM module 20 includes the circuitry needed to read or write 64-bit words of uniformly shifting bit-field data using the scheme described above. Referring now to FIG. 9, the components of the DRAM module 20 are shown. The DRAM module 20 includes a DRAM block 80, which is implemented as a DRAM macro of the sort that is currently available as a predefined block of circuitry from manufacturers of chips having integrated DRAM and logic functionality. The DRAM block 80 is organized as 1K rows, each of which holds 2K bits, with a 128 bit data word. If all of one row is used while another row is activated, a new data word can be accessed every 6ns. To reduce wiring and to better match with logic speeds, a 64-bit data word with a 3ns clock period is used instead. This rate conversion is accomplished by a 128:64 multiplexer 82, which connects a 64-bit data path to a selected half of the 128-bit DRAM block data word during each clock cycle. The multiplexer 82 provides an added level of memory granularity, as both halves of each 128-bit word must be used for maximum efficiency. This constraint is dealt with in the data organization by adding one more level to the site grouping hierarchy described above. In a similar manner, additional levels in which the word-size is cut in half could be added if additional rate conversion was desired. Beyond the multiplexer 82, and thus for the remainder of the operations performed by the processing node 12 (FIG. 2), the basic memory word size is taken to be 64 bits.

Coupled to the output of the multiplexer 82 is a 64-bit barrel rotator (or shifter) 84, which can shift a memory word from 0 to 63 positions (with wraparound) in one clock period. This rotation, together with word addressing, allows the processing node to shift any bit-field periodically within a sector.

Additional flexibility can be obtained by using a butterfly network in place of the barrel shifter, as is discussed under "Additional Features."

Mesh I/O

Connected to the output of the barrel shifter 84 is a mesh I/O unit 86. The mesh I/O unit 86 performs substitutions of bits in one processing node for corresponding bits in another processing node to turn periodic bit-field shifts within each node into uniform lattice shifts. In the illustrated embodiment, each processing node has sufficient I/O resources to send and receive up to 8 bits per clock along each of the three axes of a 3D cubic lattice; however, this number could be made larger or smaller. Because of the manner in which bit-field shifts are implemented, any bit that is transferred out of the processing node by the mesh I/O unit 86 in one direction is replaced with a bit that arrives at the mesh I/O unit 86 from the opposite direction. Thus, I/O bit-streams for opposite directions along the lattice are configured in pairs. As shown in the figure, the 24-bit mesh I/O bit-stream consists of a 24-bit mesh I/O unit input 88 and a 24-bit mesh I/O unit output 90. When an input 88 is configured to replace a bit, the bit to be replaced appears at the corresponding output 90. Otherwise, the output 90 has a constant value of zero. The 48 mesh-I/O signals 14 (FIG. 2) for the chip thus consist of 24 inputs which are distributed to all mesh I/O units, and 24 outputs which are constructed by taking the logical OR of all corresponding mesh-I/O unit outputs.

Mesh communication resources are shared among all of the DRAM modules. Each DRAM module deals with only one word at a time, and all of the bits in each word belong to a single bit-field which may be shifted. There is no fixed assignment of I/O resources to particular DRAM modules. How far a given bit-field can be shifted in one step depends on competition for resources among all the modules. In the described embodiment, sufficient communications resources are provided to simultaneously shift 8 bit-fields, each by up to the distance between two elements of a site-group, with each bit-field shifting along all three orthogonal dimensions at the same time. The actual maximum size of these shifts in units of lattice positions depends upon the size of the sector, which is what determines the site-group spacing. With the same communication resources, four bit-fields can be shifted up to twice as far, two bit-fields four times as far, or one bit-field eight times as far.

Bits that are to be replaced in one node are output through the mesh I/O unit 86 onto the mesh I/O interface 14 (FIGS. 1–2) to be received by a mesh I/O unit in another node, where the received bits are used to replace the corresponding bits that were output from that node, as earlier described. Mesh signals are reclocked after each traversal of a mesh link 14, and a single bit can hop along each of the three dimensions in turn as part of a single shift operation, thereby allowing the bit-field shifts to be in arbitrary directions in 3D. If the processing nodes are interconnected as a 1D or 2D array, the mesh I/O resources from the unused dimensions are reassigned to active dimensions.

The Processing Element

After all bit substitutions have been made, the output from the DRAM module 20 on a 64-bit data bus 92 is a 64 bit word of correctly shifted bit-field data that is available as input data for the processing elements 18. As shown in FIG. 2, the processing node 12 includes twenty of the DRAM modules 20. This number of modules is a practical number which can reasonably be fit onto a semiconductor chip today. Using twenty DRAM modules, the processing node can potentially process up to 20 bits of shifted bit-field data for each of 64 lattice sites at a time, as illustrated in the memory access example 94 of FIG. 10.

Figure 10:
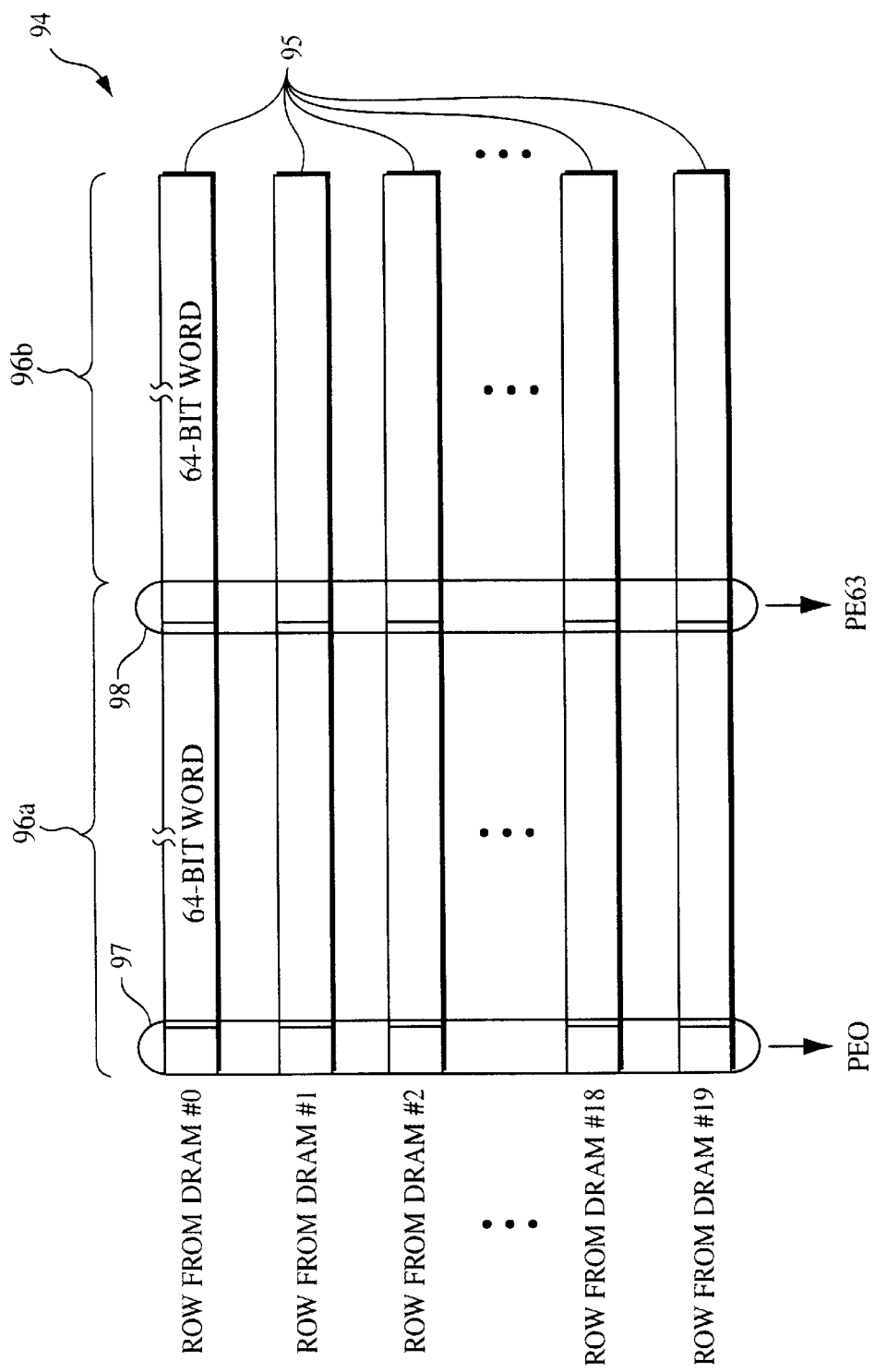
FIG. 10 shows a sample set of DRAM rows that are processed together during a single row-period.

Referring to FIG. 10, rows of words accessed simultaneously 95 (in each of twenty DRAM modules 20 of FIG. 2) are shown. The first word 96a accessed in each DRAM module 20 is shown on the left, the second word 96b is shown on the right. It will be understood that for a DRAM row of 32 64-bit memory words, all 32 words of each row are processed as a unit, all 32 being either read or written. For simplicity, however, only two words of each row are depicted. The order in which the various words are accessed depends upon the various shifts of the associated bit-fields that are being performed, as was described earlier. Some of the twenty DRAM rows 95 that are simultaneously accessed may contain non-bit-field data. For example, one of the rows may contain data which controls which set of DRAM rows will be processed next, and how they will be processed.

Groups of twenty words (e.g., 96a or 96b) are accessed simultaneously. Of these twenty words 95, those that contain bit-field data that are to be used together all are associated with the same set of 64 lattice sites: the same site-group. FIG. 10 illustrates that groups of corresponding bits from each simultaneous word (e.g., 97 or 98) are handled by individual PEs (e.g., PE0 or PE63). Each PE processes bit-field data from one lattice site at a time.

Figure 11:
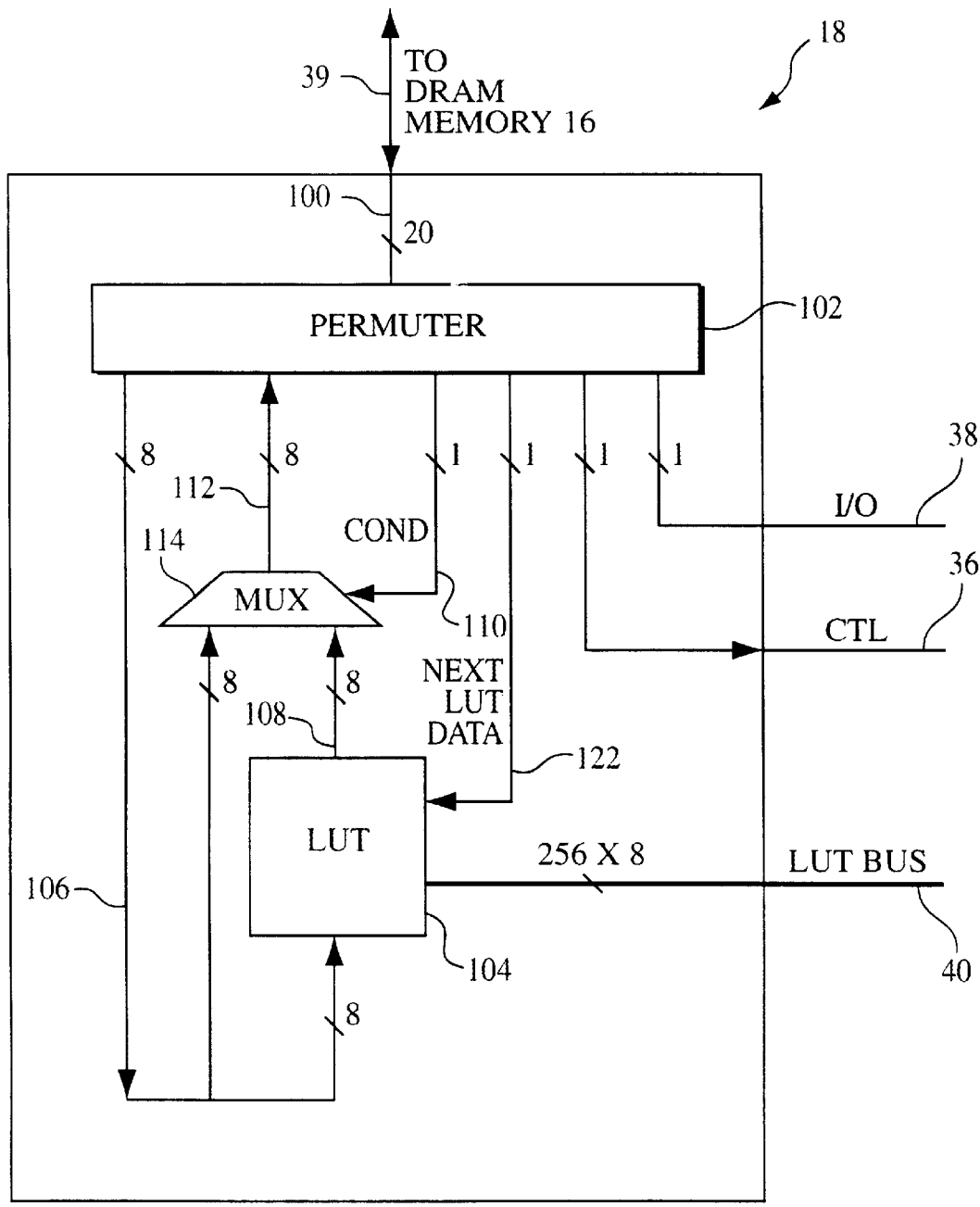
FIG. 11 is a block diagram of the processing element shown in FIG. 2, illustrating hardware optimized for SIMD table-lookup processing.

A wide variety of different processing elements, with or without persistent internal state, are compatible with the memory/communications organization used in this design. In FIG. 11, the processing element 18 (FIG. 2) is illustrated as a PE well suited to symbolic processing of lattice data. As shown, a 20-bit memory-to-PE interface 100 connects each PE 18 to the twenty DRAM modules 20. Each PE 18 receives a bit-line from each of the DRAM modules 20 and all of the twenty bit lines in the interface 100 for a particular PE 18 correspond to the same bit position within a DRAM word. Some of the lines are used as inputs and some are used as outputs. The direction of data flow depends upon how the DRAM modules have been configured for the current set of rows that are being processed.

The PE 18 includes a permuter 102, which attaches each of the 20 bit-lines from the memory 16 to any of 20 functional lines inside the PE. The permuter 102 is a reconfigurable switching device which produces a complete one-to-one mapping of bit-lines from two separate sets of lines (i.e., the memory module side and internal PE side) based on configuration information supplied by the controller 30 (FIG. 2). The permuters 102 in each PE 18 are configured identically at any given time. In each PE 18, 9 inputs are dedicated to data coming from a set of bit-fields, 8 outputs are dedicated to data going to a different set of bit-fields, one input is dedicated to program control information that is sent to the controller 30, one input carries lookup table data to be used for later processing, and the remaining wire is involved in I/O operations to and from the memory 16. The permuter allows data from any DRAM module to play any role.

Bit-field data flows through the processing elements. Input data arrive from one set of DRAM modules and results are deposited into a different set of DRAM modules. Since entire DRAM rows are processed at a time, a given choice of DRAM data directions, mesh I/O communication paths and PE permuter settings lasts at least 32 clocks (the time it takes to access all 32 64-bit words of a given 2 Kbit row). The amount of time required to process one set of DRAM rows is referred to as a row-period.

Table Lookup Processing

The basic data-transforming operation within each PE 18 is performed by a lookup table (LUT) 104 with 8-inputs and 8-outputs. All LUTs 104 in all of the PEs use identical table data. Each LUT 104 performs independent 8-bit lookups into the shared data. Eight input bits 106 from some lattice site are transformed by the LUT 104 into 8 new output bits 108, which are deposited into a different set of bit-fields than the input bits 106 came from. A ninth input bit is used as a conditional bit 110. This ninth bit (together with global control information) determines whether or not the LUT 104 should be bypassed within the PE. When not bypassed, the 8-bit LUT output 108 becomes the 8-bit PE output 112. When bypassed, the 8-bit LUT output 108 of the LUT 104 is ignored and the input bits 106 become the PE output 112. As shown in the figure, the conditional bit operates as a select for a LUT MUX 114, which receives as inputs the input bits 106 and the 8-bit LUT output 108 and, based on the state of the conditional bit 110, selects one of these inputs as the PE output 112. Larger LUTs (i.e., LUTs with more inputs) can be efficiently simulated by using a sequence of smaller LUTs in conjunction with the conditional bit 110. Using a sequence of data movements and LUTs, any calculation on a regular spatial lattice can be performed.

During each update of a site-group, all of the PEs 18 operate in the same manner. Each works on the same set of bit-fields and sees the data for a particular lattice site. They each transform their respective data in the same manner, using the same LUT 104. The LUT 104 has 256 8-bit entries, specified by a total of 2 Kbits of data copied from a single DRAM row. During each row-period, one DRAM module is selected to provide a row of data for use as the LUT 104 during the next row-period. The data arrives as 32 64-bit words, with one bit of each word entering each PE through a next-LUT input 122 during each of 32 clocks. The data is double buffered, so at any given time, each PE stores 32 bits of current LUT data and 32 bits of next-LUT data. Each of the 64 PEs broadcasts its current 32 bits of LUT data onto a separate portion of the 2K-bit LUT bus 40, and all of the PEs share the data on the LUT bus 40, each using a multiplexer to perform 8-input/8-output lookups with these 2K shared bits.

Figure 12:
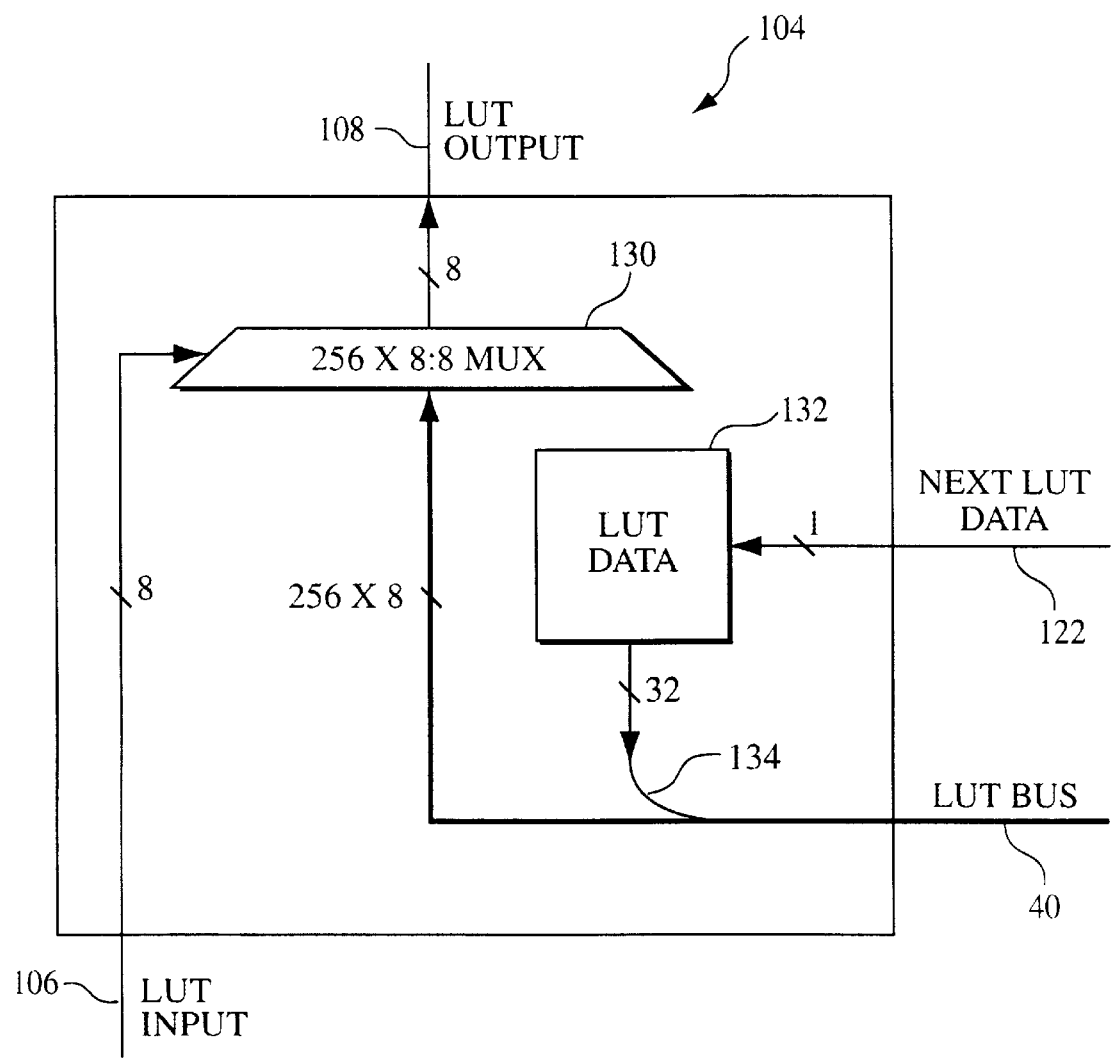
FIG. 12 is a block diagram of the shared lookup table shown in FIG. 11.

Referring to FIG. 12, the composition of the LUT 104 is shown. The 8 bits of LUT input data 106 control a 256×8 to 8 multiplexer 130, which selects 8 bits of data from the LUT bus 40. The LUT 104 further includes a LUT data unit 132, which holds 64 bits of LUT data. The LUT data unit 132 is illustrated in more detail in FIG. 13.

Figure 13:
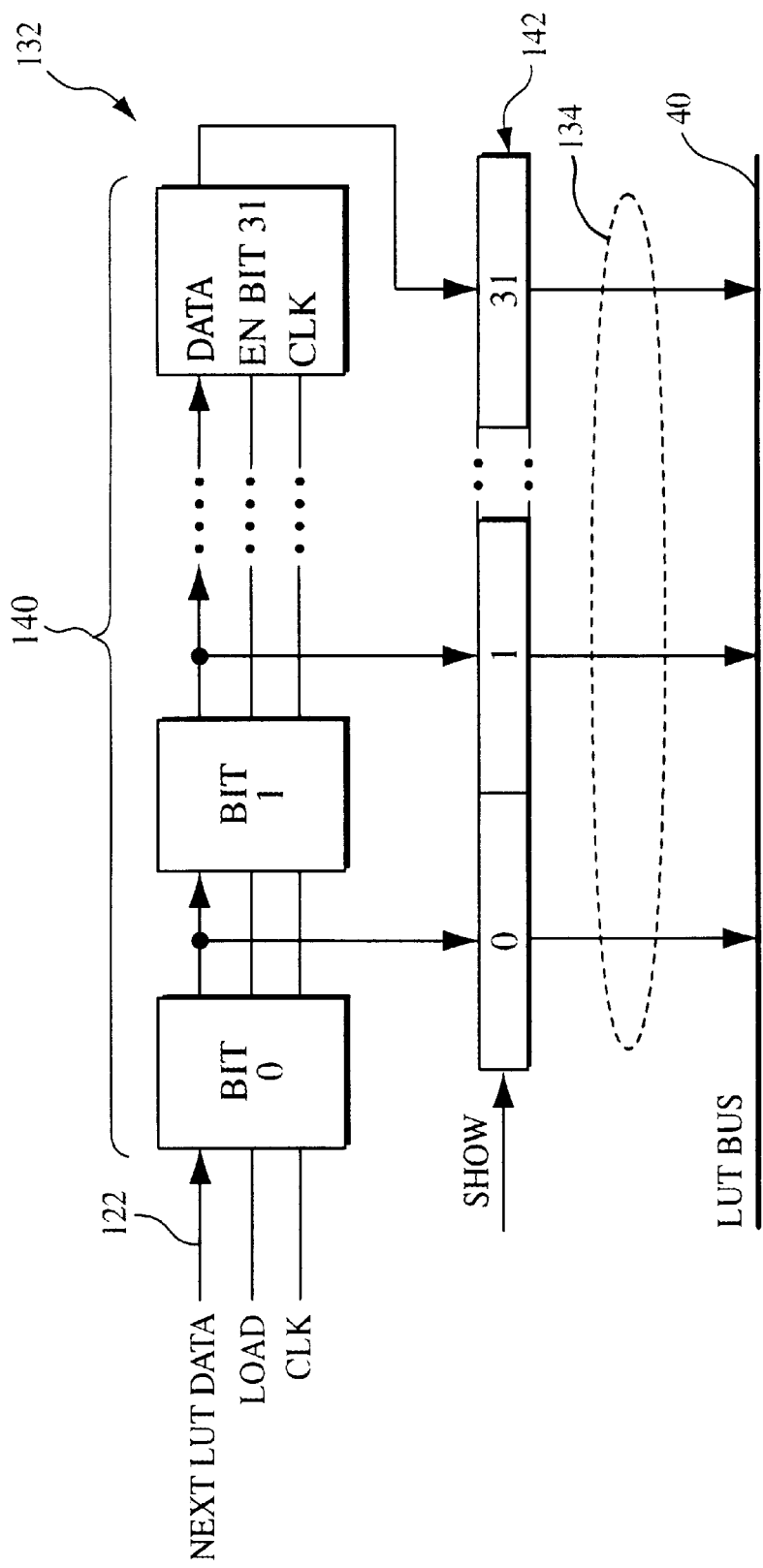
FIG. 13 is a block diagram of the LUT data unit shown in FIG. 12.

Referring to FIG. 13, the LUT data unit 132 includes a 32 bit shift register 140 for loading a sequence of 32 next-LUT data bits 122 on consecutive clocks of the row-period, and a 32 bit latch 142 which can latch 32 bits in parallel from shift register 140 and drive them onto 32 distinct wires of the 2 Kbit wide LUT bus 40. New data is serially accumulated in the shift register 140 while previous data is being driven onto the LUT bus 40. Thus all LUT data can be changed as often as every row-period. Both the serial loading of next-LUT data 122 and the parallel loading of current-LUT data 134 are separately controlled during each row-period (with shared control for all PEs). Note that when LUT data on the LUT bus 40 is changed, other data paths to the memory 20 and the mesh I/O 14 are normally also changed. Data on the LUT bus 40 remains constant for at least one row-period before it is again changed.

In addition to allowing the LUT 104 to be changed for every row-period, the above-described scheme also provides a large lookup table shared by all PEs that can be quickly filled with a row of bit-field data. When used in this manner, all lattice sites in the same sector can randomly access the set of lattice site data contained in the LUT 104. This provides a non-local communications mechanism. A similar operation is also very useful for data reformatting. A row of bit-field data to be reformatted is stored into the LUT. A set of predefined constant rows of data are then used as LUT inputs in order to permute this data within a row (or even between rows) in any desired manner. This kind of operation can be made more efficient if, in addition to an 8-input/8-output LUT, the same 2 Kbits of table data can also alternatively be used as an 11-input/1-output LUT. Since this only uses a total of 12 wires, whereas an 8-input/8-output LUT uses 16, there are 4 unused LUT wires in this case. These can be usefully assigned as output wires, containing additional copies of the single output value. The conditional bit 110 can still be used in the 11-input/1-output case. It simply replaces the single output bit of the LUT with one of the inputs.

Serial Arithmetic

An important application of lattice computation is numerical processing. Integer addition and subtraction can be performed efficiently using the LUT mechanism described above, but multiplication and division (as well as floating point operations, and transcendental functions) would be rather slow. To multiply two k-bit integers using only LUTs, the processing node 12 needs to pass each bit of each number in and out of DRAM approximately k times. With the addition of simple bit-serial arithmetic hardware, which includes data registers within the PEs, these operations can be performed with only a single pass through DRAM, using the full memory bandwidth.

Bit-serial processing is also fully compatible with the site-group shifting mechanism, and allows economical register use with time-multiplexed PEs. Bit-serial arithmetic hardware receives the bits of the numbers it operates on sequentially. For example, to multiply two unsigned integers, the bits of the multiplicand might first be sent into the serial multiplication unit, one bit at a time. Then the bits of the multiplier would be sent in one at a time, starting with the least significant bit (lsb). As the multiplier bits enter the multiplication unit, bits of the product leave the multiplication unit. The hardware inside the multiplication unit is very simple. It includes a register large enough to hold the multiplicand, an accumulator register of the same size that can shift by one position at a time, and an adder that can conditionally add the multiplicand into the accumulator, depending on the value of the current multiplier bit. When no additional multiplier bits remain, a new multiplicand can be loaded in while the final bits of the product are leaving. Division uses essentially the same hardware, and algorithms for common transcendental functions are known which use similar hardware.

To map such a numerical processing algorithm onto the embodiment heretofore described, integer data is stored together in DRAM rows, and serial arithmetic hardware is added to each PE. An appropriate data format for serial arithmetic is to have single DRAM rows hold data corresponding to many different bit fields for the same set of lattice sites. For example, one word of a row could contain the lsb of a 32-bit integer present at each of 64 lattice sites (i.e., the lsb bit-field for a site-group). Other words within the row would contain each of the other bit-fields for the same site-group of integers. An exemplary data format for serial arithmetic is illustrated in FIG. 14B.

Figures 14A, 14B:
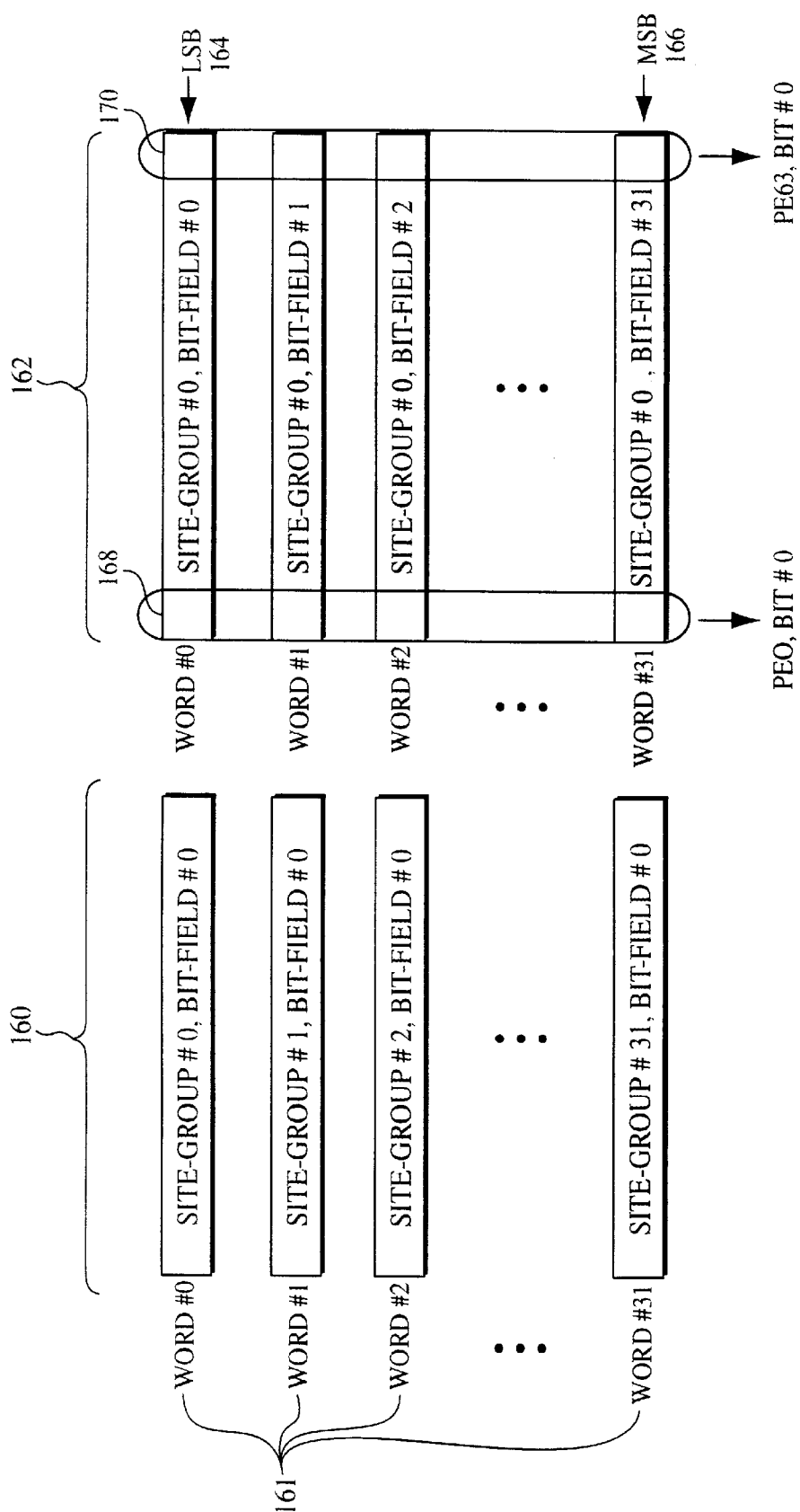
FIGS. 14A and 14B are illustrations of a single-bit-field row data format and a single-site-group row data format, respectively.

Referring to FIG. 14A, in a single-bit-field (per row) data format 160, all words 161 in a given DRAM row contain data belonging to the same bit-field. Each word 161 contains data from a different site-group. Taken together, these words form a larger site-aggregate. Referring to FIG. 14B, in a single site-group (per row) data format (or, numerical row format) 162, all words contain data from the same site-group, with each word belonging to a different bit-field. If these words are read starting with the lsb-word 164 and proceeding in order of bit significance to the msb-word 166, then each PE sees the consecutive bits of an integer—for example, PE0 sees consecutive bits of one integer 168 and PE63 sees consecutive bits of another integer 170—in successive clocks, which is exactly the kind of format needed by serial arithmetic algorithms. Reading these words in other orders yields other useful serial bit orderings. A number of DRAM rows belonging to the same site-group of lattice sites may also be processed before moving on to the next site-group. In this way, data can remain in PE registers during sequences of operations.

The single site-group per row data format 162 (FIG. 14B) puts site-groups of 32-bit integers together into single DRAM rows. By addressing the appropriate set of rows, shifted integer data can be brought together for a given site-group. Since each DRAM word is the portion of a bit-field belonging to this site-group, the rotation and inter-chip bit substitution hardware of FIG. 9 is perfectly suited to complete the shift of integer bit-field data seamlessly, exactly as described earlier. Data can also be quickly converted back and forth between single site-group per row format 162 and the single-bit-field per row format 160 (FIG. 14A) as necessary, using the LUT-based PE of FIG. 11. If the controller 30 is able to change the order of the LUT inputs at each clock (e.g., the permuter is a Benes network, and the controller changes the bits controlling the final butterfly involving the LUT inputs), then this format conversion only requires each bit of each number to pass through the PEs twice. If about 100 bits of storage is available within each bit-serial arithmetic processor, this conversion can be done in a single pass. Moreover, since numbers will mostly be handled arithmetically, such conversion shouldn't need to be done frequently.

Single-input and single-output bit-serial arithmetic hardware can be integrated with the LUT based PE of FIG. 11. For example, eight copies of such serial hardware (with a total of eight inputs and eight outputs) could be configured by the controller 30 to replace the multiplexer 130 of FIG. 12, taking inputs 106 and transforming them into outputs 108. All serial units in all PEs would share a common configuration/control stream. Next-LUT data 122, I/O data 38, and control data 36 would all pass through the PE as usual. The shared LUT data on the LUT bus 40 would be available for use by the arithmetic hardware. This shared LUT could contain, for example, function tables used by CORDIC algorithms. Note that this bit-serial arithmetic processing approach would also work efficiently in a chip architecture with very few DRAM modules coupled to each set of PEs.

External Memory

Providing the processing nodes 12 with access to external memory makes it possible to perform large computations using small arrays of nodes. Even on large arrays of nodes, the usefulness of calculations (particularly in 3 or more dimensions) may depend crucially on how large a lattice can be emulated. External memory is also useful for holding extra lookup table data and other control information, and for accumulating analysis information.

As shown in the processing node 12 of FIG. 2, the master memory interface 22 serves as a high-speed interface to a (potentially large) external memory associated with each node. Communication between external memory and the DRAM modules 20 passes through the PE I/O port 38 (FIG. 11). External memory can be regarded as an additional level in the memory granularity hierarchy discussed earlier. In order to emulate a very large lattice, each processing node can keep most of its sector data in external memory. This sector is partitioned in a shift-invariant manner into external site-aggregates, each consisting of the number of lattice sites that will be accessed together in the external memory. For a particular set of bit-field shifts, the update operation that is to be applied to the entire lattice can be performed on each external site-aggregate separately. Periodically shifted data for a particular external site-aggregate can be read into on-chip memory, processed, and then written back to external memory. If the update operation involves lattice sites with many bit-fields, some of which must be accessed multiple times in the course of the update, then completely processing one external site aggregate before moving on to the next may save a significant amount of time (since keeping the data on-chip greatly speeds up the repeated accesses).

Note that, for arithmetic operations, the single site-group per row data format 162 discussed earlier makes it possible to have each DRAM row filled with data from just 64 lattice sites. This can make it convenient to perform numerical computations in which very large data objects are kept at each lattice site, and only a very small part of the lattice is on chip at any given time.

Simplifying the Shifting

Shifting hardware and control can be simplified if some mild constraints are placed on the way that sites can be aggregated.

As has been described, a hierarchy of shift-invariant partitions is used to aggregate lattice sites that are processed together, and bit-field data are structured as a corresponding hierarchy of bit-aggregates in the memory. Shifting is performed hierarchically. Shifted bit-field data for a largest site-aggregate is accessed by addressing a largest bit-aggregate associated with a correspondingly shifted largest site-aggregate, and then performing any remaining shift on the addressed data. This remaining shift only involves data within the largest bit-aggregate, and is performed by a recursive application of the same technique of splitting the shift into a part that can be performed by addressing, and a part that is restricted to smaller site-aggregates.

Shifting can be simplified if the site-aggregates that are grouped together to form a larger aggregate are all related by a translation along a single direction. For example, the first 16 site-groups of the partition illustrated in FIG. 7 are all horizontal shifts of each other, and so could form such a single-direction site-aggregate. The vertical shifts of such a site-aggregate would form other single-direction site-aggregates, which together would constitute a shift-invariant partition of the lattice. The site-groups that form each aggregate are naturally ordered sequentially along the aggregation direction. If the corresponding words of a bit-field are similarly ordered, then periodic shifts along this direction only involve a rotation of this ordering. A particularly simple example of single-direction aggregation is the grouping of individual sites into the striped site-groups shown in FIG. 7. As already discussed, in performing bit-field shifts only a rotator is needed to reorder the bits within words.

If this single aggregation-direction constraint is observed at the lowest levels of aggregation, then both the control and the hardware can be simplified, since only address rotations are needed to perform shifts at these levels. Furthermore, it is sometimes the case (as in the first example above) that shifts along the aggregation direction can be accomplished by addressing alone, without need for any further shifting within each addressed bit-aggregate. The use of such aggregates allows the additional simplification that all elements of such an aggregate can be processed using identical periodic shifts. It is assumed that DRAM row data have this property, so that all words in a row are rotated identically.

Control

Given a high rate of access to lattice data, complex processing requires a concomitantly high rate of access to control information. Since a row-period is the atomic unit of processing, for maximum flexibility a significant amount of control information will be associated with each row-period. As has been described, $\frac{1}{20}$ of the memory bandwidth has been devoted to ensuring that a different LUT can be used for each row-period.

Another $\frac{1}{20}$ of the memory bandwidth is devoted to ensuring that other control information can be changed for each row-period.

As can be seen in FIG. 11, during each row-period, one of the DRAM modules attached to each PE provides control information via control output 36. While one set of DRAM rows are being processed, 2 Kbits of data are accumulated within the controller 30 (FIG. 2) for controlling the next row-period via control stream 37. This data includes the next row address to be used by each of the DRAM modules 20, information about the order in which words within rows should be accessed for each DRAM module, information about word rotations for controlling the barrel shifter 84 (FIG. 9) and the mesh I/O unit 86, the common 15 setting to be used for all permuters 102 (FIG. 11) and other PE data, information about which DRAM module will be connected via I/O 38 to external memory through RDRAM master 24 (FIG. 2) or RDRAM slave 28, etc. The 2 Kbits of control data can be viewed as a single microcode instruction. Provisions are made for encoding a sequence of similar operations on a group of consecutive rows within each DRAM module 20 as a single instruction in order to reduce the memory used for instruction storage.

In addition to the internal control stream 37, control and initialization data also pass through external I/O interfaces 28 and 34 (FIG. 2). These I/O channels are used for initializing memory contents and for real-time control and feedback. Instruction data are stored within the memory modules 20 of each node, and function as a set of microprograms. Execution of the current microprogram and scheduling of the next are overlapped: data are broadcast to all processing nodes about which 2 Kbit microcode instruction to execute when the current microprogram finishes (or reaches a scheduled decision point). In a single-node system, the external control that schedules the sequence of microprograms to run comes from a conventional microprocessor and is memory mapped using the slave memory interface 26 shown in FIG. 2. In a larger system, memory mapped microprogram-scheduling data come into a single distinguished node via the slave interface 26 and are passed along to the rest of the system via the serial-I/O interface 34. Serial-I/O pipeline delays are compensated for within each node separately when nodes are initiating (or terminating) a synchronous parallel operation. Low-bandwidth data-I/O (including initial program loading into all nodes) can also use the serial-I/O interface 34.

For higher bandwidth external-I/O, data is accessed through the slave interface 26 of the distinguished node, and the DRAM on this node is memory mapped. Any data anywhere in the array of nodes can be shifted (under microprogram control) through the mesh I/O interface 14, so that it becomes accessible within the distinguished node. Data that is common to all nodes (or any subset of nodes) can be written once, and then rapidly distributed under microprogram control. This kind of data broadcast is important for distributing program data to all nodes. It is also useful in setting up large physical simulations, which often have initial states that are characterized statistically and algorithmically as a function of spatial location. Even complex surfaces can be described in a compressed, encoded format, which is later expanded algorithmically within the nodes. By writing the same sectors of data to many nodes, modifying small portions of the data, and performing some local computation within each node, many physical simulations can be initialized without transferring large amounts of data. For loading or saving large data sets in parallel, all of the nodes can perform I/O through their respective master memory interfaces 24. In addition to RDRAM memory, large disk devices with direct RDRAM interfaces can also be connected here and, anticipating FPGA's with RDRAM interfaces, other high-bandwidth circuitry can be interfaced here.

Conditional operations can be performed which depend upon lattice data. Each conditional operation involves using serial-I/O interface 34 to communicate a request to all other nodes, which may subsequently at a suitable decision point simultaneously initiate a new microprogram—without the intervention of an external microprocessor. Some control latency can be hidden by speculative execution. The next microprogram is started at the decision point assuming no new program will be scheduled. This program is written in a manner that avoids overwriting current lattice state information as new state information is generated, at least until enough time has passed that it is known that no new program will be scheduled. Such execution can be interrupted if necessary, and a new microprogram started that ignores the partially completed new lattice state data.

In a single-chip embedded system, a nonvolatile memory such as a serial ROM can be connected to serial I/O line 34 to provide initialization data, making it possible to avoid the use of a microprocessor altogether. Controller status information and DRAM I/O data 38 (FIG. 11) may be placed on the serial-I/O interface 34 under program control. This data can be decoded by external logic to produce signals that interface with external circuitry (eg., interrupt signals for a microprocessor). It might be convenient to have a simple conventional processor on-chip managing the serial-I/O interface 34, thereby making its protocols flexible and extendible. Such an on-chip processor could also be useful in system initialization.

Virtual Machine Models

The foregoing efficiently supports a wide variety of virtual machine models. The simplest of these is a fixed-lattice machine having uniform bit-field data movement. Another supported model is the multi-resolution machine: a fixed lattice machine in which some bit-fields are represented with less resolution than others. This kind of model can be implemented by reusing the same bit-field data at several different nearby-shifted positions, rather than keeping separate data for all lattice sites. If the lower resolution data is not changed during site updating, then the processing remains equivalent to a simultaneous updating of all sites. If the lower resolution bits are changed, then their values at the end of each update of the lattice will depend upon the order in which they are paired with other lattice bits.

A related model is the multi-grid machine, in which power-of-two subsets of lattice data interact more often and at greater range than other lattice data. For example, an entire 2D lattice might first be updated using a nearest neighbor interaction, then only sites with coordinates that are both even would be updated, using a second neighbor interaction along each axis, then only sites with coordinates that are multiples of four using a fourth neighbor interaction, etc. This kind of technique is sometimes used to speed up numerical lattice simulations. Here, each power-of-two subset is an element of a shift-invariant partition of the lattice, and can be constructed out of the kind of shift-invariant striped partitions that have been used above. For very coarse partitions, only a few elements from each stripe will be updated—this can be accomplished using the conditional bit 110 (FIG. 11) in the PE. The controller 30 (FIG. 2) also suppresses the mesh-I/O unit substitution of data that won't be updated, permitting all of the communication resources to be reserved for bits that will actually participate in the update. Note that, when eight or fewer bits in a site-group are shifted, these can be moved arbitrarily far through the lattice before being substituted for bits in other nodes (the number of clocks used by the mesh communication pipeline is extended as necessary).

A particular kind of multi-resolution model is a pyramid machine model. A 2D example of such a model might begin with a lattice filled with numerical data, with the goal being to calculate the sum of all of the numbers. This could be accomplished by partitioning the lattice into 2×2 blocks and calculating the sum for each block separately. These sums could then in turn be partitioned into 2×2 blocks, and the sum for each of these blocks calculated, and so on. At each step, data at two different resolutions interact, and the spatial distance between the lower-resolution sum-sites (which can be pictured as lying at the center of each 2×2 block of higher-resolution sum-sites) doubles at every step. Just as in the multi-grid model, the final steps are performed by masking updating of some sites using the conditional bit 110, and taking advantage of fast shifts of sparse data. This kind of calculation is useful for accumulating statistical information about a spatial system, finding extreme values of field data, and for other kinds of analysis.

A crystal lattice model is a machine model in which the spatial arrangement of lattice data is not uniform, but has a regular crystalline structure. Regularly spaced subsets of the crystal lattice sites are called sublattices, and bit-fields are associated with sublattices. For example, a 2D checkerboard has two sublattices, which could be called the red sublattice and the black sublattice. Some bit-fields might be associated with both sublattices, and some only with the red sublattice. The black sublattice would then have no bit-fields associated with corresponding data. Some of the site-updating might involve the data associated with both sublattices, and might apply to all sites. Some of the site-updating might cause the uniform data to interact with the red-sublattice data, and would apply only to the sites of the red sublattice.

It might also be that red sublattice data sometimes shifts to the black sublattice, leaving no data on the red sublattice at the next step. This would be a simple example of a reconfiguring crystal lattice model, in which the system goes through a sequence of crystal lattices. In such a model, both the amount and type of data associated with the various sublattices can change with time. Note that reconfiguring lattice models are very common, since any use of temporary variables in updating lattice sites results in some bit-fields that appear and then disappear. In calculations where several processing steps are applied to the same site-aggregate before moving on to another site-aggregate, temporary variables may be used and freed, and so the same memory storage may be available for reuse as temporary storage in updating subsequent site-aggregates.

Clearly many other variants and combinations of machine models are also possible. Fine-grained control at the level of each individual row-period also makes many other kinds of efficient computations possible, such as the kinds of data-reformatting transformations alluded to earlier for numerical data. Computations can be "pipelined in time" by emulating a wavefront of variable data moving through a higher dimensional volume of parameters (e.g., the wavefront of a computation moving through a logic circuit). The shared LUT within each node can act as a powerful communications primitive, allowing non-local transfers of data in the emulated lattice. Combined with the facility to send small amounts of lattice data arbitrarily far in one processing step, various kinds of mesh routing algorithms can be efficiently implemented. Thus the machine model encompasses considerably more than a fixed lattice with uniform data movement.

Additional Features

It should be emphasized that a spatially scalable mesh architecture of the sort described here is also scalable as technology improves, allowing more devices to be put onto each chip. The most direct scaling involves simply putting several of the nodes described above onto each chip, arranged in a regular array. Only one copy of the direct RDRAM slave interface 28 (FIG. 2) and of the serial-I/O interface 34 are required. The number of PEs may be adjusted to match advancing logic speed and changing DRAM parameters by altering the time-multiplexing factor for the PEs (i.e., the effective word size, as determined by the multiplexer 82 of FIG. 9).

Some computations would be more efficient if it were possible to use a smaller site-group. In particular, this would allow the use of smaller 3D sectors to efficiently emulate small 3D lattices. The effect of having smaller site-groups can be achieved by splitting the site-groups up into a set of smaller site-aggregates that together form a shift-invariant partition of the lattice. Each site-group then consists of several smaller site-aggregates, all of which are processed in parallel. The same amount of information is needed to control the permuting of the bits within a word in all cases. As a single 64-bit word, for example, 6 bits are needed to specify the rotation amount, and by choosing the aggregation of words into rows appropriately, the same rotation can be used for all words of the same bit-field during a given row-period. Similarly, if, for example, the 64-bit word is divided up into four 16-bit aggregates, then 4 bits are needed for a given bit-field to specify a single fixed rotation of all 16-bit aggregates during a row-period. Two additional bits are needed to specify a rotation of the order of the four aggregates that comprise each 64-bit word, again totaling 6 bits of control information. The amount of hardware used in a 64-bit barrel rotator 84 is also sufficient for the more general permutation. In fact, if the rotator is implemented as a butterfly network, then it is only necessary to change the control of the network to allow the 64-bit word to be split into smaller bit-aggregates that can be individually rotated, and also rotated as blocks within the word. This additional flexibility in the control of the butterfly network also removes some constraints on the control of the mesh-I/O unit 86 (FIG. 9), which may make it slightly more complicated.

Another possible enhancement concerns interconnect. Thus far, the discussion has been limited to arrays of nodes in 1D, 2D and 3D, since physical arrays of nodes in more dimensions are not uniformly scalable. It should be noted, however, that the same hardware described here, with only the provision of additional communication resources, and a corresponding change to the mesh-I/O unit, can be used with any number of dimensions of interconnect. It should be emphasized, however, that the physical interconnect does not limit the maximum number of dimensions of the lattice that can be emulated by a given array of nodes of the preferred embodiment, since each node can emulate a sector of a lattice with any desired number of dimensions, limited only by available memory.

The embodiment described here is aimed at simultaneously achieving very high memory bandwidth, a single large on-chip address-space, and efficient sharing of inter-chip communications resources. Similar architectures based on data movement using shift-invariant partitioning can be adapted to other constraints. A particularly interesting example is a lattice-computer node design that is constrained to be essentially just an ordinary DRAM chip. In this case a single large block of on-chip DRAM might be coupled to the PEs, with whole rows still accessed one word at a time. By providing storage for several rows of DRAM data along with the PEs, new PEs that were very similar to those outlined above could be constructed (but with only one serial arithmetic unit per PE). Mesh-communications resources (i.e., pins) would only be needed for shifting a single bit-field at a time, and if the master RDRAM interface 24 in FIG. 2 is omitted, the result would be a memory chip with only a handful of extra pins. For LUT processing, correctly shifted bit-field data for the PE inputs would be accumulated one row at a time, then the LUT would be used to produce the output rows, one at a time, which would be stored back into DRAM. This would also have the advantage that update operations with fewer than eight bit-field inputs or outputs would not waste dedicated memory bandwidth, and similarly as long as control or LUT data isn't changed, no memory bandwidth is dedicated there either. Long power-hungry wires wouldn't be needed to bring together data from distant DRAM blocks, and there would be no constraint on which rows of DRAM can be accessed simultaneously—the constraint of "only one row from each DRAM block" disappears when there is only one DRAM block. High aggregate memory bandwidth could be achieved with this kind of architecture by putting arrays consisting of several single-DRAM nodes together on the same chip. With such an array, however, the advantage of a single large address space would be lost, and more mesh-I/O pins would be needed.

The single memory-module version of the data movement architecture discussed above uses more buffering and less parallelism than the 20 memory-module version. Intermediate architectures with a few coupled memory modules would also be interesting. These would also share the advantage of having little memory bandwidth dedicated to specific functions, such as control, and would have more parallism. In multi-module embodiments, including the 20 memory module embodiment detailed above, it may be useful to allow memory lines that aren't used by a PE to be connected to each other. Since all of the bit-field shifting is done by the memory modules 20, this would allow bit-field data to be shifted and copied independently of the other operations of the PEs.

As noted earlier, an FPGA with a direct RDRAM interface would provide a convenient way to connect a processing node to external circuitry—for example, for image processing. An alternative would be to put some FPGA logic onto the same chip with the processing node, adding some reconfigurable I/O pins, and perhaps making the existing mesh-I/O pins reconfigurable. Such a hybrid lattice/FPGA chip would be particularly convenient for embedded applications, which would involve electronic interfacing and some buffering of data for synchronous lattice processing. The FPGA array would connect to the rest of the chip through the controller 30 of FIG. 2. It would be capable of overriding parts of the controller's state machine, in order to directly control the RDRAM interfaces and other on-chip resources. It could use the DRAM modules 20 simply as high-bandwidth on-chip memory, if desired.

Finally, it should be emphasized that the design of the PE is quite independent of the mechanism described here for efficiently assembling groups of shifted lattice site bits. The same shift mechanism can be used with many fewer or many more bit-fields coming together at each PE. The basic elements stored and shifted and applied to each PE can also be larger than single bits. There is a rich history of SIMD PEs, which provides many alternatives for how to independently and identically process many parallel streams of data. The preferred embodiment described here couples one particular style of SIMD processing with a rather general data-field shift mechanism in a spatial lattice computer.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of performing operations associated with a process occurring in at least one emulated lattice of at least one sector having lattice sites therein, the operations being performed by at least one processing node, the processing node associated with the at least one sector and including a memory, comprising:

associating each of the lattice sites with data in a data structure;

partitioning the data at the lattice sites into sets of homologous bits, one from each data structure at each lattice site, to form corresponding bit-fields;

partitioning the lattice sites in a shift-invariant manner into groups each including a plurality of lattice sites to form corresponding first site-aggregates, the data in each bit-field being correspondingly partitioned into first bit-aggregates;

grouping together the first site-aggregates to form a plurality of second site-aggregates that partition the lattice sites in a shift-invariant manner;

grouping together pluralities of the first bit-aggregates to form second bit-aggregates, each second bit-aggregate aggregating data associated with the lattice sites of a corresponding second site-aggregate;

storing in the memory each second bit-aggregate as an addressable unit composed of separately addressable first bit-aggregates; and shifting data for at least one of the bit-fields within the at least one sector by addressing each second bit-aggregate in which a portion of the at least one of the bit-fields is stored, and addressing each of the constituent first bit-aggregates in the addressed each second bit-aggregate.

2. The method of claim 1, further comprising:

processing bit-field data for each of the lattice sites to be updated to transform the value of the associated data structure.

3. The method of claim 2, wherein processing comprises performing a symbolic operation.

4. The method of claim 2, wherein processing comprises performing a numerical operation.

5. The method of claim 2, wherein processing comprises:

reading from the memory the bit-field data for each lattice site to be updated;

updating the read bit-field data; and writing the updated bit-field data to the memory.

6. The method of claim 5, wherein the step of updating occurs after the step of shifting and the bit-field data read from the memory are shifted bit-field data.

7. The method of claim 5, wherein the step of updating occurs before the step of shifting and the bit-field data written to the memory are shifted bit-field data.

8. The method of claim 1, wherein the at least one sector comprises a plurality of sectors and the operations are performed by an array of processing nodes, each associated with a different one of the sectors in the plurality of sectors and communicating with others of the processing nodes associated with neighboring ones of the sectors in the plurality of sectors.

9. The method of claim 8, further comprising:

shifting periodically the bit-field data within each sector of each associated processing node, whereby the data that shifts past an edge of the sector wraps to the beginning of an opposite edge of the sector, the periodic shifting being performed by memory addressing and by re-ordering bits within addressed ones of the first bit-aggregates.

10. The method of claim 9, further comprising:

reading by the processing nodes the periodically shifted bit-field data, each accessing data for a one of the first site-aggregates to be processed; and communicating the wrapped data to a nearby one of the processing nodes, the communicated wrapped data being substituted for the wrapped data within the nearby one of the processing nodes to which it is communicated.

11. The method of claim 10, further comprising:

processing the shifted bit-field data.

12. The method of claim 11, wherein processing includes using a table lookup.

13. The method of claim 12, wherein each of the processing nodes includes a plurality of processing elements for processing a parallel stream of the bit-field data and the table lookup is shared by all of the processing elements in each processing node.

14. The method of claim 13, further comprising:

loading the bit-field data into the shared lookup table so that data from all of the lattice sites in a given one of the sectors can be used to randomly access data belonging to a fixed set of the lattice sites.

15. The method of claim 11, wherein the plurality of lattice sites aggregated within each of the first site-aggregates have a uniform spacing relative to each edge of the at least one sector, the difference for any two of the first site-aggregates in the respective numbers of lattice sites lying within a give distance of an edge being at most one.

16. The method of claim 11, wherein each second bit-aggregate aggregates first bit-aggregates associated with a single one of the sectors in the plurality of sectors, and which in their pattern of grouping of data associated with the lattice sites, are all periodic translations of each other along a single line in the single sector.

17. The method of claim 11, wherein each of the processing nodes includes a plurality of processing elements for processing a parallel stream of the bit-field data, wherein the second bit-aggregate aggregates first bit-aggregates associated with a plurality of the bit-fields, and wherein each processing element includes bit-serial arithmetic hardware.

18. The method of claim 11, wherein the at least one emulated lattice includes at least two emulated lattices, the at least two emulated lattices having unequal numbers of the bit-fields, and wherein shifted bit-field data from the at least two emulated lattices are processed together.

19. The method of claim 11, wherein the at least one sector has at least two dimensions, and each of the first site-aggregates includes a set of the lattice sites that is unsymmetric about every parallel to at least one edge of the at least one sector.

20. The method of claim 1, wherein the memory has the property that consecutive accesses to each of the plurality of first bit-aggregates is fastest if each first bit-aggregate in the plurality of first bit-aggregates is a part of a single one of the second bit-aggregates.

21. The method of claim 20, wherein the at least one sector has at least two dimensions, and each of the first site-aggregates includes a set of the lattice sites that is unsymmetric about every parallel to at least one edge of the at least one sector.

22. The method of claim 21, wherein the at least one sector comprises a plurality of sectors and the operations are performed by an array of processing nodes, each associated with a different one of the sectors in the plurality of sectors and communicating with others of the processing nodes associated with neighboring ones of the sectors in the plurality of sectors.

23. A processor for performing operations associated with a process occurring in at least one emulated lattice having at least one sector and having a plurality of lattice sites therein, the processor comprising:

a processing node associated with the at least one sector, the processing node including a memory for storing lattice site data associated with the plurality of lattice sites, each of the lattice sites having an associated data structure;

wherein sets of homologous bits, one from each associated data structure at each lattice site, form bit-fields;

wherein a shift-invariant partition of the least one sector into pluralities of lattice sites form first site-aggregates;

wherein first site-aggregates are grouped to partition the lattice sites of the at least one sector in a shift-invariant manner to form a plurality of second site-aggregates;

wherein a portion of each bit-field associated with each first site-aggregate forms a first bit-aggregate;

wherein pluralities of the first bit-aggregates are grouped together to form second bit-aggregates, each aggregating data associated with a corresponding second site-aggregate;

wherein the memory stores each second bit-aggregate as an addressable unit composed of separately addressable first bit-aggregates; and wherein the processing node shifts data for at least one of the bit-fields within the at least one sector by addressing each second bit-aggregate in which each portion of the at least one of the bit-fields is stored, and addressing each of the constituent first bit-aggregates in the addressed each second bit-aggregate.

24. The processor of claim 23, wherein the processing node includes a plurality of processing elements coupled to the memory, the processing elements operating in parallel to process the shifted data received from the memory, each of the processing elements in the plurality of processing elements updating bit-field data corresponding to a different lattice site in the shifted data.

25. The processor of claim 24, wherein the memory includes at least two memory blocks, and more than one of the at least two memory blocks are coupled to each processing element.

26. The processor of claim 24, wherein the plurality of processing elements share a lookup table.

27. The processor of claim 24, wherein each processing element includes bit-serial arithmetic hardware.

28. The processor of claim 23, wherein the memory includes at least one memory block and portions of the at least one memory block are selected to store control information used during a period in which a row of memory words is processed.

29. The processor of claim 24 further comprising:

a plurality of the processing nodes, each of the processing nodes in the plurality of processing nodes connected by mesh I/O links to neighboring processing nodes in the plurality of processing nodes to form a mesh array, each of the processing nodes in the plurality of processing nodes being associated with an equal-sized sector of the emulated lattice; and wherein the performance of the operations is divided among the plurality of the processing nodes.

30. The processor of claim 28, further comprising:
a barrel shifter connected to the at least one memory block for re-ordering bits within memory words.

31. The processor of claim 28, further comprising:
a butterfly network connected to the at least one memory block for re-ordering bits within memory words.

32. The processor of claim 28, further comprising:
a mesh I/O unit coupled to the at least one memory block for identifying a bit as having shifted beyond a sector boundary and transferring the identified bit to a next adjacent sector for a corresponding bit substitution.

33. The processor of claim 24, wherein the operations are performed under the control of a host to which the processor is connected.

34. The processor of claim 24, wherein the processing node is coupled to a nonvolatile memory device for storing a program and a copy of the program is loaded into the processing node at boot time.

35. The processor of claim 24, wherein the processing node includes reprogrammable logic blocks of the sort used in FPGA devices, along with reprogrammable I/O pins, for interfacing with other electronic devices.

36. The processor of claim 24, wherein the processing node controls an external memory device used for storing bit-field data and for storing control information.

37. The processor of claim 24, wherein the memory has the property that consecutive memory accesses to each of a set of several first bit-aggregates is fastest if each first bit-aggregate of the set of several first bit-aggregates is a part of a single one of the second bit-aggregates.

38. The processor of claim 23, wherein the at least one sector has at least two dimensions, and each of the first site-aggregates includes a set of lattice sites that is unsymmetric about every parallel to at least one edge of the at least one sector.

39. The processor of claim 23, wherein constituent first bit-aggregates are ordered within each second bit-aggregate, such ordering being reflected in the associated memory addresses, and wherein the grouping and ordering of first bit-aggregates is such that the shifting of the at least one bit-field involves only a cyclic permutation in the order of each set of constituent first bit-aggregates within the corresponding second bit-aggregate.

40. A method of performing operations associated with a process occurring in at least one emulated lattice of at least one sector of at least two dimensions having lattice sites therein, the operations being performed by at least one processing node, the at least one processing node associated with the at least one sector and including a memory, comprising:

associating each of the lattice sites with data in a data structure;

partitioning the data at the lattice sites into sets of homologous bits, one from each data structure at each lattice site, to form corresponding bit-fields;

partitioning the lattice sites in a shift-invariant manner into groups of lattice sites, each group being unsymmetric about every parallel to at least one edge of the at least one sector, to form a plurality of corresponding site-aggregates, the data in each bit-field being correspondingly partitioned to form bit-aggregates;

storing each bit-aggregate as an addressable unit in the memory; and shifting data for at least one of the bit-fields within the at least one sector of the emulated lattice by addressing each bit-aggregate in which a portion of the at least one of the bit-fields is stored.

41. The method of claim 40, further comprising:
processing bit-field data for each of the lattice sites to be updated to transform the value of the associated data structure.

42. The method of claim 41, wherein processing comprises performing a symbolic operation.

43. The method of claim 41, wherein processing comprises performing a numerical operation.

44. The method of claim 41, wherein processing comprises:
reading from the memory the bit-field data for each lattice site to be updated;
updating the read bit-field data; and
writing the updated bit-field data to the memory.

45. The method of claim 44, wherein the step of updating occurs after the step of shifting and the bit-field data read from the memory are shifted bit-field data.

46. The method of claim 44, wherein the step of updating occurs before the step of shifting and the bit-field data written to the memory are shifted bit-field data.

47. The method of claim 40, wherein the at least one sector comprises a plurality of sectors and the operations are performed by an array of processing nodes, each associated with a different one of the sectors in the plurality of sectors and communicating with others of the processing nodes associated with neighboring ones of the sectors in the plurality of sectors.

48. The method of claim 47, further comprising:
shifting periodically the bit-field data within each sector of each processing node, whereby the data that shifts past an edge of the sector wraps to the beginning of an opposite edge of the sector, the periodic shifting being performed by memory addressing and by re-ordering bits within the addressed ones of the bit-aggregates.

49. The method of claim 48, further comprising:
reading by the processing nodes the periodically shifted bit-field data, each accessing data for a one of the site-aggregates to be processed; and
communicating the wrapped data to a nearby one of the processing nodes, the communicated wrapped data being substituted for the wrapped data within the nearby one of the processing nodes to which it is communicated.

50. The method of claim 49, further comprising:
processing the shifted bit-field data.

51. The method of claim 50, wherein processing includes using a table lookup.

52. The method of claim 51, wherein each of the processing nodes includes a plurality of processing elements for processing a parallel stream of the bit-field data and the table lookup is shared by all of the processing elements in each processing node.

53. The method of claim 52, further comprising:
loading the bit-field data into the shared lookup table so that data from all of the lattice sites in a given one of the sectors in the plurality of sectors can be used to randomly access data belonging to a fixed set of the lattice sites.

54. The method of claim 50, wherein the lattice sites that are aggregated within each of the site-aggregates have a uniform spacing relative to each edge of the at least one sector, the difference for any two of the site-aggregates in the respective numbers of lattice sites lying within a given distance of an edge being at most one.

55. The method of claim 50, wherein there are at least two emulated lattices, the at least two emulated lattices having unequal numbers of the bit-fields, and wherein shifted bit-field data from the at least two emulated lattices are processed together.

56. A processor for performing operations associated with a process occurring in at least one emulated lattice having at least one sector of at least two dimensions having lattice sites therein, the processor comprising:

a processing node associated with the at least one sector, the processing node including a memory for storing lattice site data associated with the lattice sites, each of the lattice sites having an associated data structure;

wherein sets of homologous bits, one from each associated data structure at each lattice site, form bit-fields;

wherein a shift-invariant partition of the at least one sector into pluralities of lattice sites forms pluralities of site-aggregates, each site-aggregate being unsymmetric about every parallel to at least one edge of the at least one sector;

wherein a portion of each bit-field associated with each site-aggregate forms a bit-aggregate;

wherein the memory stores each bit-aggregate as an addressable unit; and wherein the processing node shifts data for at least one of the bit-fields within the at least one sector of the emulated lattice by addressing each bit-aggregate in which each portion of the at least one of the bit-fields is stored.

57. The processor of claim 56, wherein the processing node includes a plurality of processing elements coupled to the memory, the processing elements operating in parallel to process the shifted data received from the memory, each of the processing elements in the plurality of processing elements updating bit-field data corresponding to a different lattice site in the shifted data.

58. The processor of claim 57, wherein the memory includes at least two memory blocks, and more than one of the at least two memory blocks are coupled to each processing element.

59. The processor of claim 57, wherein the plurality of processing elements share a lookup table.

60. The processor of claim 57, wherein each processing element includes bit-serial arithmetic hardware.

61. The processor of claim 56, wherein the memory includes at least one memory block and portions of the at least one memory block are selected to store control information using during a period in which a row of memory words in processed.

62. The processor of claim 57 further comprising:

a plurality of the processing nodes, each of the processing nodes in the plurality of processing nodes connected by mesh I/O links to neighboring processing nodes in the plurality of processing nodes to form a mesh array, each of the processing nodes in the plurality of processing nodes being associated with an equal-sized sector of the emulated lattice; and wherein the performance of the operations is divided among the plurality of the processing nodes.

63. The processor of claim 61, further comprising:

a barrel shifter connected to the at least one memory block for re-ordering bits within memory words.

64. The processor of claim 61, further comprising:

a butterfly network connected to the at least one memory block for re-ordering bits within memory words.

65. The processor of claim 61, further comprising:

a mesh I/O unit coupled to the at least one memory block for identifying a bit as having shifted beyond a sector boundary and transferring the identified bit to a next adjacent sector for a corresponding bit substitution.

66. The processor of claim 57, wherein the operations are performed under the control of a host to which the processor is connected.

67. The processor of claim 57, wherein the processing node is coupled to a nonvolatile memory device for storing a program and a copy of the program is loaded into the processing node at boot time.

68. The processor of claim 57, wherein the processing node includes reprogrammable logic blocks of the sort used in FPGA devices, along with reprogrammable I/O pins, for interfacing with other electronic devices.

69. The processor of claim 57, wherein the processing node controls an external memory device used for storing bit-field data and for storing control information.

* * * * *

UNITED STATES PATENT AND TRADEMARK OFFICE
CERTIFICATE OF CORRECTION

PATENT NO. : 6,205,533 B1                                    Page 1 of 1
DATED       : March 20, 2001
INVENTOR(S) : Norman H. Margolus It is certified that error appears in the above-identified patent and that said Letters Patent is hereby corrected as shown below:

<u>Title page,</u>
Item [56] References Cited, OTHER PUBLICATIONS, the "Flynn" reference, "c-21" should be -- C-21 --.

<u>Column 19,</u>
Line 11, after "common", delete "15".
Line 12, after "PE", insert -- configuration --.

<u>Column 30,</u>
Line 6, "using" should be -- used --.

Signed and Sealed this

Twenty-eighth Day of May, 2002

Attest:

JAMES E. ROGAN
*Attesting Officer*  *Director of the United States Patent and Trademark Office*